(12) United States Patent
Konuma et al.

(10) Patent No.: US 8,951,154 B2
(45) Date of Patent: Feb. 10, 2015

(54) HYDRAULIC TENSIONER

(75) Inventors: Takayuki Konuma, Wako (JP); Osamu Emizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 13/399,702

(22) Filed: Feb. 17, 2012

(65) Prior Publication Data

US 2012/0252615 A1  Oct. 4, 2012

(30) Foreign Application Priority Data

Mar. 31, 2011  (JP) .................................. 2011-077424
Mar. 31, 2011  (JP) .................................. 2011-077426

(51) Int. Cl.
*F16H 7/08*  (2006.01)

(52) U.S. Cl.
CPC ...... *F16H 7/0848* (2013.01); *F16H 2007/0806* (2013.01); *F16H 2007/0814* (2013.01); *F16H 2007/0817* (2013.01); *F16H 2007/0859* (2013.01)
USPC .......................................................... 474/110

(58) Field of Classification Search
USPC ........................ 474/5, 91, 110–115
See application file for complete search history.

(56) References Cited

U.S. PATENT DOCUMENTS

| | | | | |
|---|---|---|---|---|
| 4,881,927 A | * | 11/1989 | Suzuki | 474/110 |
| 5,707,309 A | * | 1/1998 | Simpson | 474/110 |
| 5,720,684 A | | 2/1998 | Mott | |
| 6,609,987 B1 | * | 8/2003 | Beardmore | 474/111 |
| 6,810,907 B2 | * | 11/2004 | Hashimoto et al. | 137/514.5 |
| 7,070,528 B2 | * | 7/2006 | Emizu et al. | 474/110 |
| 7,699,730 B2 | * | 4/2010 | Emizu et al. | 474/110 |
| 8,002,656 B2 | * | 8/2011 | Emizu et al. | 474/109 |
| 8,137,224 B2 | * | 3/2012 | Emizu et al. | 474/110 |
| 2003/0216202 A1 | * | 11/2003 | Emizu et al. | 474/109 |
| 2006/0063625 A1 | * | 3/2006 | Emizu et al. | 474/110 |
| 2009/0197721 A1 | * | 8/2009 | Emizu et al. | 474/110 |
| 2009/0197722 A1 | * | 8/2009 | Emizu et al. | 474/110 |
| 2010/0173735 A1 | * | 7/2010 | Suchecki | 474/110 |
| 2012/0252616 A1 | * | 10/2012 | Tawarada et al. | 474/110 |

FOREIGN PATENT DOCUMENTS

JP  3594420 B2  12/2004
JP  2009-180359 A  8/2009

* cited by examiner

*Primary Examiner* — William A Rivera
*Assistant Examiner* — Michael Riegelman
(74) *Attorney, Agent, or Firm* — Birch, Stewart, Kolasch & Birch, LLP

(57) ABSTRACT

A hydraulic tensioner applies appropriate tension to an endless power transmitting belt. The hydraulic tensioner includes a plunger body, an oil supply path, a check valve, a relief valve, a pressure maintaining valve interposed in a relief path and a pressure accommodating hole. The hydraulic tensioner is configured such that a path that is branched from the oil supply path for operating the pressure maintaining valve is formed independently of a supply path to the check valve.

17 Claims, 17 Drawing Sheets

HYDRAULIC TENSIONER

CROSS-REFERENCE TO RELATED APPLICATIONS

This nonprovisional application claims priority under 35 U.S.C. §119(a) on Patent Application Nos. 2011-077424 and 2011-077426, filed in Japan on Mar. 31, 2011, respectively. The entirety of each of the above-identified applications is incorporated herein by reference.

BACKGROUND OF THE INVENTION

1. Field of the Invention

The present invention relates to a hydraulic tensioner that applies appropriate tension to an endless power transmitting member, such as an endless chain or an endless belt for the power transmission of a valve motion mechanism of an internal combustion engine.

The present invention also relates to leak oil emitting device for a hydraulic tensioner that applies tension to an endless power transmitting member configured from a chain, a belt or the like used in a valve motion of an internal combustion engine.

2. Description of Background Art

An internal combustion engine incorporated in a vehicle such as a motorcycle includes a hydraulic tensioner for pressing an endless power transmitting member, which drives a camshaft of a valve motion mechanism in order to prevent flapping of the endless power transmitting member upon operation of the internal combustion engine.

A hydraulic tensioner is available, wherein a pressure maintaining valve for preventing a pressure drop in a high pressure oil chamber in the hydraulic tensioner in a state in which the oil supplying pressure drops upon stopping of operation of an internal combustion engine is provided in an oil supplying path (refer to, for example, Japanese Patent Laid-Open No. 2009-180359).

An internal combustion engine incorporated in a motorcycle or the like has an endless power transmitting member for driving a cam of a valve motion. In order to prevent flapping of the endless power transmitting member upon operation, the internal combustion engine includes a hydraulic tensioner for pressing the endless power transmitting member. As a conventional example, an example is available wherein the internal pressure of the hydraulic tensioner, which becomes a high pressure, is kept at an appropriate pressure by a gap appearing between a plunger made of a flexible material and a hollow sleeve fitted in the inside of the plunger, and leak oil is emitted from an emitting flow path provided in a housing (refer to, for example, Japanese Patent No. 3594420). However, since the oil entering the gap between an outer face of the plunger and a chamber wall face (plunger accommodating hole) cannot flow out quickly to the outside, movement of the plunger upon forward motion is suppressed, and the follow-up property for a movement of a tensioner slipper is deteriorated. However, if it is tried to carry out accuracy management of the gap over the overall contact area between the plunger outer face and the plunger accommodating hole, then since the accuracy management region is wide, the cost increases.

SUMMARY OF THE INVENTION

With the hydraulic tensioner disclosed in Japanese Patent Laid-Open No. 2009-180359, wherein a pressure maintaining valve is provided in an oil supplying path, by blocking the oil supplying path and an oil discharging path, also upon stopping of operation of the internal combustion engine, the oil pressure in the high pressure oil chamber can maintain a high level similarly as upon operation of the internal combustion engine. Also, upon re-starting of the internal combustion engine, the hydraulic tensioner can have an appropriate tensioning characteristic to the endless power transmitting member similarly as in the operation state of the internal combustion engine.

However, in order to obtain such a characteristic as just described, it is necessary to enhance the pressure resisting property and the sealing property of parts in the hydraulic tensioner, and there is the possibility that an increase of the cost may be provided.

The present invention relates to improvements in a hydraulic tensioner, which overcome such a defect as described above, and it is an object of the present invention to provide a hydraulic tensioner which can maintain an endless power transmitting belt in an appropriate tension state in whichever operation or stopping state an internal combustion engine is.

In order to achieve the object described above, according to an embodiment of the present invention, a hydraulic tensioner, includes a plunger, said plunger being acted upon by reactive force from an endless power transmitting belt; a plunger body cooperating with said plunger to form a high pressure oil chamber for storing pressure oil therein; a biasing device accommodated in said plunger, said biasing device being configured to push out said plunger toward said endless power transmitting belt; an oil supply path configured to supply oil into said high pressure oil chamber; a check valve configured to permit supply of the oil from said oil supply path into said high pressure oil chamber; a relief valve configured to communicate a relief path with an oil pressure higher than a predetermined oil pressure in said high pressure oil chamber; and a pressure maintaining valve interposed in said relief path for being opened and closed by the oil pressure of said oil supply path, wherein a path that is branched from said oil supply path for operating said pressure maintaining valve is formed independently of an oil supply path to said check valve.

According to an embodiment of the present invention, the hydraulic tensioner is configured such that the relief path and the oil supply path are in communication with each other by an oil supply pressure to the pressure maintaining valve.

According to a further embodiment of the present invention, the hydraulic tensioner is configured such that the pressure maintaining valve is provided in a returning path in communication with the relief path and the oil supply path, and in the returning path, the valve body of the pressure maintaining valve is formed in a cylindrical shape and a top portion side circumferential face of the cylindrical valve body is formed with a reduced diameter.

According to a further embodiment of the present invention, the hydraulic tensioner is configured such that a drain oil path in communication with the outside is provided in the plunger body, and the relief path and the drain oil path are in communication with each other by an oil supply pressure to the pressure maintaining valve.

According to a further embodiment of the present invention, the hydraulic tensioner is configured such that the pressure maintaining valve is formed in a cylindrical shape, and a cylindrical portion top face upon which operating oil acts and an emission hole for emitting the operating oil to the drain oil path side are provided on a cylindrical portion side face such that the operating oil is emitted through the inside of the pressure maintaining valve.

According to a further aspect of the present invention, the hydraulic tensioner is configured such that the oil supply path is configured through the inside of a valve body which configures the relief valve, and oil is supplied from an end portion of the relief valve.

According to a further embodiment of the present invention, the hydraulic tensioner is configured such that a holding plate for holding an end portion of a coil spring, which biases the relief valve, is disposed at a location of the oil supply path to which the oil is supplied from the end portion of the relief valve, and an oil introduction hole is provided in the holding plate.

According to a further embodiment of the present invention, the hydraulic tensioner is configured such that the pressure maintaining valve is provided in a converging relief path to which the relief paths converge after being formed radially from a hydraulic cylinder.

The present invention also enhances the emission property of oil through a gap between an inner circumferential face of a plunger body and an outer circumferential face of a plunger to reduce the sliding resistance of the plunger by oil resistance thereby to smoothen the movement of the plunger.

The present invention solves the problem described above, and according to an embodiment of the present invention, the hydraulic tensioner further comprises a gap portion, through which oil in said high pressure oil chamber can flow out to the outside, is provided between an inner circumferential face of said plunger body and an outer circumferential face of said plunger, wherein a downstream side gap of said gap portion through which the oil flows out has an area greater than that of an upstream side gap of said gap portion.

According to an embodiment of the present invention, the hydraulic tensioner is configured such that inner and outer diameters and working tolerances are set such that a gap dimension where the dimension of the downstream side gap is formed smallest is greater than a gap dimension where the dimension of the upstream side gap is formed greatest.

According to an embodiment of the present invention, the hydraulic tensioner is configured such that an oil emitting groove is formed on a downstream side sliding face of the plunger body such that an upstream end thereof extends to the upstream side gap.

According to an embodiment of the present invention, the hydraulic tensioner is configured such that the plunger has a plunger stepped portion formed from a plunger large diameter portion on the upstream side and a plunger small diameter portion on the downstream side; the plunger body has a plunger accommodating hole stepped portion formed from a plunger accommodating hole large diameter portion corresponding to the plunger large diameter portion on the upstream side of the plunger and a plunger accommodating hole small diameter portion corresponding to the plunger small diameter portion of the plunger; the plunger stepped portion of the plunger engages with the plunger accommodating hole stepped portion of the plunger body to form a coming off preventing structure for the plunger; and the oil emitting groove is formed on the plunger accommodating hole small diameter portion such that an upstream end thereof extends to the plunger accommodating hole large diameter portion.

According to a further embodiment of the present invention, the hydraulic tensioner is configured such that the oil emitting groove is formed by machining on the plunger accommodating hole small diameter portion from the downstream end side, and the tip of the working tool reaches the plunger accommodating hole large diameter portion.

According to an embodiment of the present invention, the hydraulic tensioner is configured such that the oil emitting groove is disposed at a position clear of the direction of movement of an endless timing chain.

According to a further embodiment of the present invention, the hydraulic tensioner is configured such that, in a state in which the hydraulic tensioner is attached to a vehicle, the hydraulic tensioner is disposed such that an oil emission direction of the oil emitting groove is directed downwardly with respect to a horizontal direction.

According to a further embodiment of the present invention, the hydraulic tensioner is configured such that the oil emitting groove is provided in a pair at opposing positions with respect to the center line of a plunger accommodating hole of the plunger body.

In the hydraulic tensioner according to the present invention, the oil released from the high pressure oil chamber by the relief valve is filled only between the downstream of the check valve and the pressure maintaining valve in the relief path, and the pressure is maintained. Consequently, the pressure on the relief valve side becomes equal to the pressure in the oil supply path. Therefore, oil of a high pressure is not filled, and accordingly, a high sealing property is not required, and reduction of the cost can be anticipated.

With the hydraulic tensioner according to the present invention, in a state in which the pressure maintaining valve comes under oil pressure, since the relief path and the oil supply path are in communication with each other and oil is circulated, a state in which oil is always filled can be maintained, and consequently, the possibility of insufficient supply can be reduced.

With the hydraulic tensioner according to the present invention, the returning path can be configured in a simplified shape, wherein only part of the shape of the valve body of the pressure maintaining valve is modified.

With the hydraulic tensioner according to the present invention, since the amount of oil is not returned to the supply side, the oil pressure on the supply side is not raised and the necessity to enhance the sealing property is eliminated.

With the hydraulic tensioner according to the present invention, since the drain oil structure can be achieved utilizing the inside of the pressure maintaining valve, the path can be simplified.

With the hydraulic tensioner according to the present invention, the oil supply path can be configured utilizing the relief valve, and consequently, the path can be simplified.

With the hydraulic tensioner according to the present invention, the oil introduction hole is formed in the holding plate, and oil supply can be carried out smoothly.

With the hydraulic tensioner according to the present invention, since the pressure maintaining valve is disposed in the converging relief path, simplification of the path by the single pressure maintaining valve can be anticipated.

In an embodiment of the present invention, the area of the upstream side gap set for oil pressure adjustment is formed small while the area of the downstream side gap is formed greater than that of the upstream side gap. Consequently, the oil emission performance on the downstream side, which does not act for oil pressure adjustment, is enhanced thereby to reduce the sliding resistance of the plunger by oil resistance. Consequently, the movement of the plunger can be smoothened.

In an embodiment of the present invention, the inner and outer diameters and working tolerances are set such that the downstream side gap is greater with certainty than the upstream side gap. Consequently, the dimension management of the gaps can be made sure and the oil emitting property of the downstream side can be enhanced.

In an embodiment of the present invention, since the oil emitting groove is formed on the sliding face downstream side, the emitting performance of oil on the downstream side can be improved.

In an embodiment of the present invention, the oil emitting groove is formed on the plunger accommodating hole small diameter portion with which the plunger stepped portion of the plunger large diameter portion is engaged such that it extends to the plunger accommodating hole large diameter portion. Accordingly, the oil emission property of the plunger accommodating hole small diameter portion can be improved.

In an embodiment of the present invention, the oil emitting groove is formed by machining on the plunger accommodating hole small diameter portion from the downstream end side such that the tip thereof reaches the plunger accommodating hole large diameter portion. Accordingly, the oil emitting groove can be formed readily.

In an embodiment of the present invention, the oil emitting groove is disposed clear of the direction of movement of the endless timing chain. Consequently, when the plunger body vibrates upon movement of the endless timing chain, the plunger small diameter portion can be prevented from being damaged by an edge of the oil emitting groove.

In an embodiment of the present invention, the hydraulic tensioner is attached in the downward direction with respect to the horizontal direction to the vehicle. Consequently, in the state in which the hydraulic tensioner is attached to the vehicle, also emission is caused by the self weight of oil. Therefore, the oil can be emitted well.

In an embodiment of the present invention, the oil emitting grooves are disposed not at neighboring positions but are spaced away from each other at the opposing positions. Consequently, oil can be emitted well while suppressing a drop in strength of the plunger body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
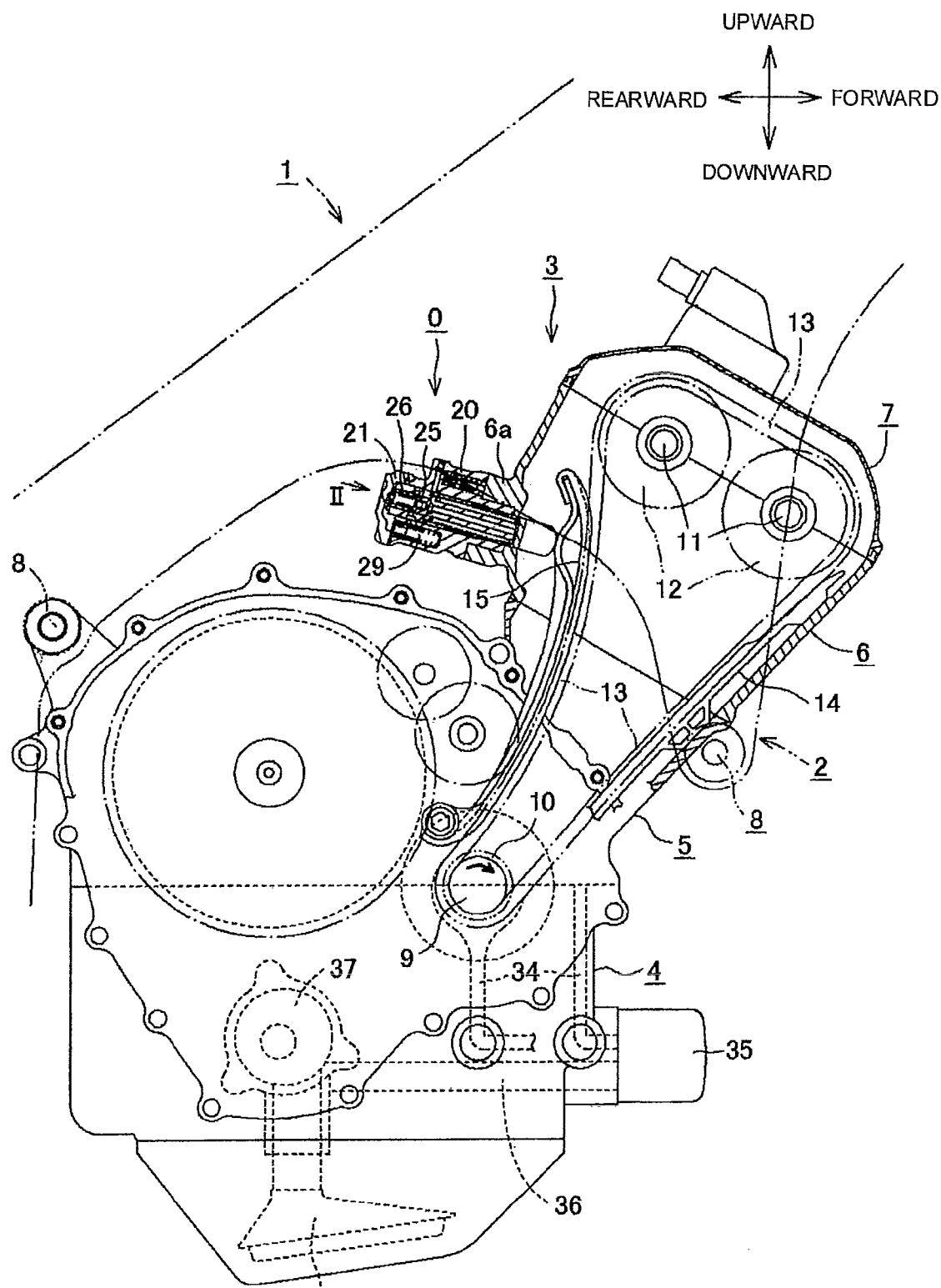
FIG. 1 shows a hydraulic tensioner lift of an embodiment of the present invention and shows an example wherein the hydraulic tensioner is applied to a timing chain, which configures a power transmitting mechanism of a valve motion mechanism in a four-stroke cycle DOHC type internal combustion engine incorporated in a motorcycle.
Figure 2:
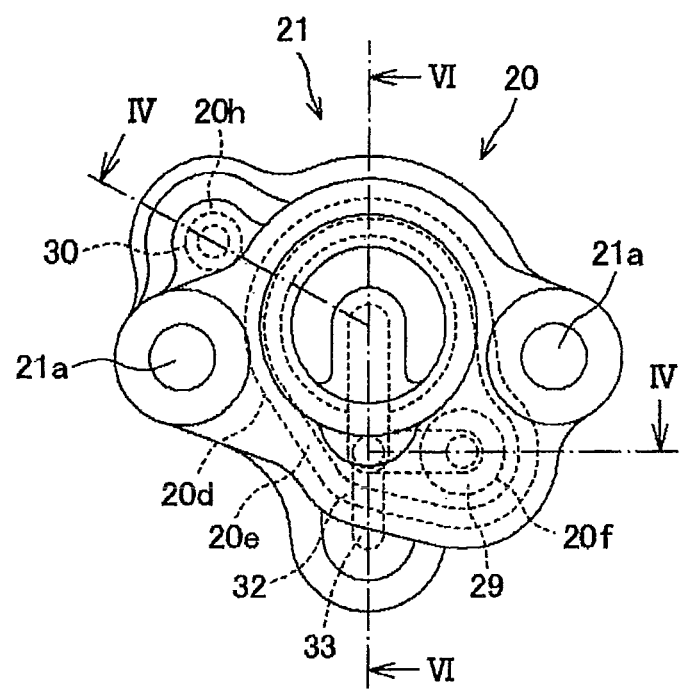
FIG. 2 is a view as viewed in the direction indicated by an arrow mark II of FIG. 1 showing a shape of a cap of the hydraulic tensioner.

The present invention will now be described with reference to the accompanying drawings wherein the same or similar elements will be identified by the same reference numeral.

In the following, a hydraulic tensioner 0 according to an embodiment of the present invention shown in FIGS. 1 to 8 is described.

FIG. 1 is a right side elevational view of an essential part illustrating a state in which an internal combustion engine 3 which includes the hydraulic tensioner 0 is attached to a vehicle body frame 1 of a motorcycle (which may otherwise be a road surface traveling vehicle such as an automobile).

In the present embodiment, forward and backward, upward and downward, and leftward and rightward directions signify the forward and backward, upward and downward, leftward and rightward directions of the vehicle body. In FIG. 1, the forward and backward directions correspond to the rightward and leftward directions on the plane of the figure; the upward and downward directions correspond to the upward and downward directions on the plane of the figure; and the leftward and rightward directions correspond to the interior side direction and this side direction with respect to the plane of the figure, respectively.

As shown in FIG. 1, the four-stroke cycle DOHC type internal combustion engine 3, which includes the hydraulic tensioner 0 is incorporated in a motorcycle and has a particular structure that the internal combustion engine 3 is attached to a hanger 2 provided at a front portion of a vehicle body frame 1 of the motorcycle and a rear portion of the vehicle body frame 1 by two bosses 8 projecting from the internal combustion engine 3.

In the internal combustion engine 3, a cylinder block 5, a cylinder head 6 and a head cover 7 are successively placed in order in the upward direction on a crankcase 4 and are coupled integrally by a coupling device such as bolts (not shown).

Further, an endless timing chain 13 extends between and around a driving sprocket wheel 10, which is integrated with a crankshaft 9 supported for rotation, and a driven sprocket wheel 12, which is integrated with a pair of camshafts 11 supported for rotation on the cylinder head 6 in the cylinder head 6 and the head cover 7, at a position sandwiched between the crankcase 4 and the cylinder block 5 of the internal combustion engine 3. Consequently, a rotating torque of the crankshaft 9, which is driven to rotate in the clockwise direction in the figure by upward and downward movement of pistons (not shown) fitted for upward and downward sliding movement in cylinder bores (not shown) of the cylinder block 5 is transmitted to the paired camshafts 11 through the driving sprocket wheel 10, endless timing chain 13 and driven sprocket wheel 12 so that intake and exhaust valves not shown are driven for opening and closing movement.

In the four-stroke cycle internal combustion engine 3, a plurality of cylinder bores (not shown) are arrayed in the vehicle widthwise direction. In this internal combustion engine 3, fuel in a combustion chamber burns in each of the cylinder bores every time the crankshaft 9 rotates twice, and the pistons are intermittently pushed toward the crankshaft 9 by pressure of the combustion gas. Further, since the traveling resistance varies in response to concaves and convexes of the road surface on which the motorcycle travels, the tension state of the endless timing chain 13 varies and the endless timing chain 13 is liable to flap in the forward and backward directions.

In order to prevent this, a chain guide 14 is disposed in contact with the endless timing chain 13 on the tension side on the front positioned rightwardly in FIG. 1 while a tensioner slipper 15 is disposed in contact with the endless timing chain 13 on the relax side on the rear positioned leftwardly in FIG. 1. Further, the hydraulic tensioner 0 is assembled to the cylinder head 6 rearwardly of and adjacent to the tensioner slipper 15. The hydraulic tensioner 0 has such a structure and a characteristic as hereinafter described in detail, and flapping of the endless timing chain 13 on the relax side can be suppressed effectively by the superior characteristic of the hydraulic tensioner 0.

Figure 4:
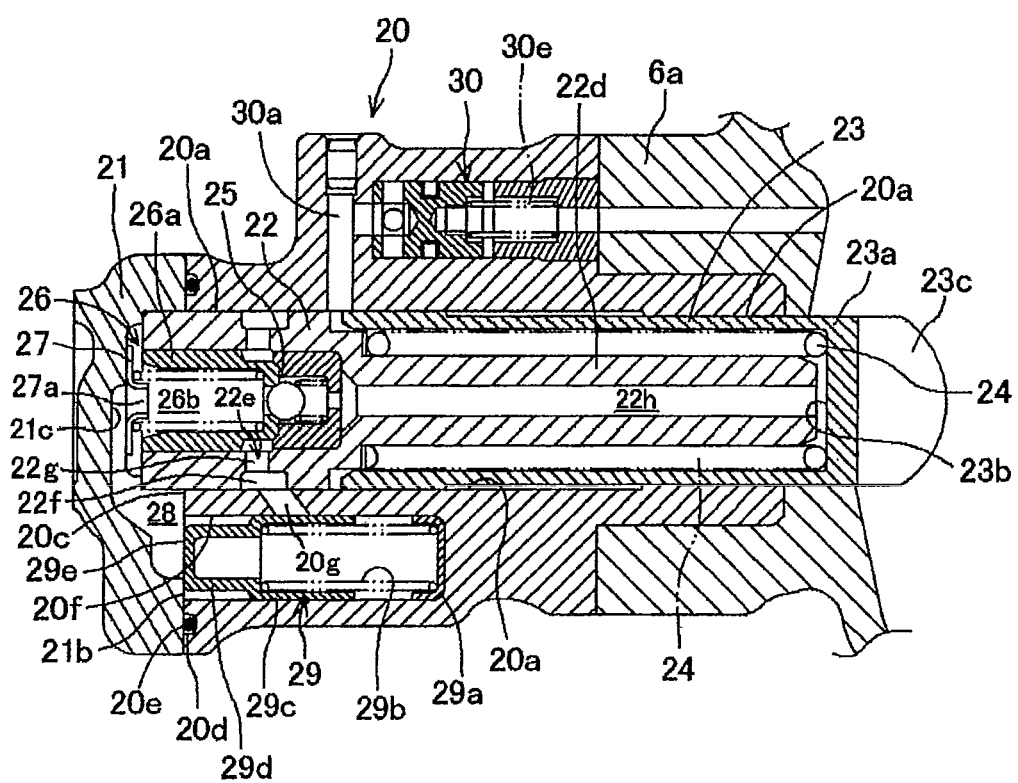
FIG. 4 is a vertical sectional view of the hydraulic tensioner taken along line IV-IV of FIG. 2.
Figure 5:
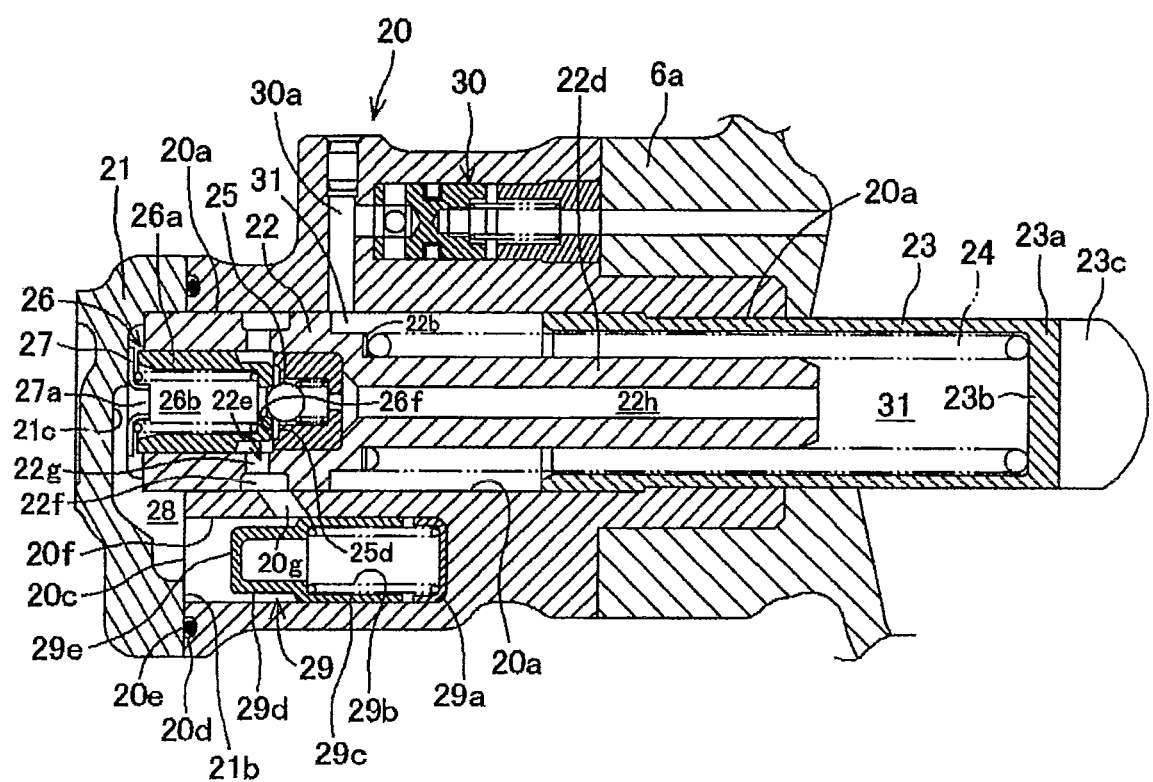
FIG. 5 is a vertical sectional view of the hydraulic tensioner in a state in which a plunger projects forwardly from the tensioner body and a tension attaching portion of a cylinder head in FIG. 4.
Figure 6:
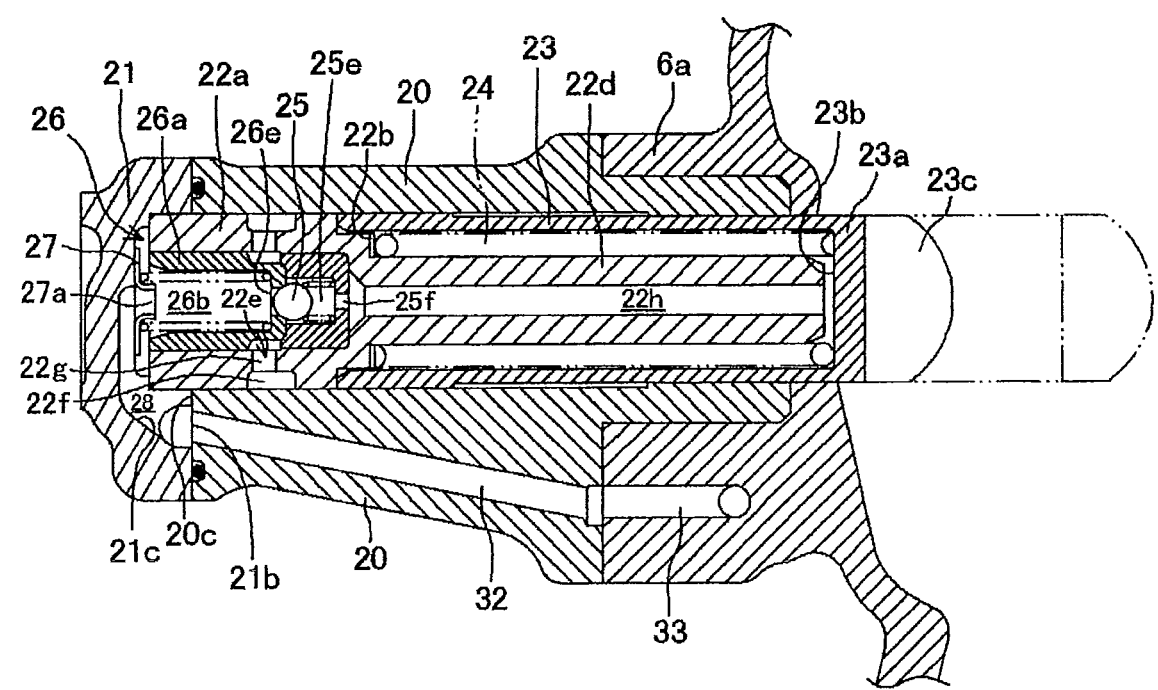
FIG. 6 is a vertical sectional view of the hydraulic tensioner taken along line VI-VI of FIG. 2.

The shell of the hydraulic tensioner 0 shown in FIG. 1 is configured from a tensioner body 20 and a cap 21. Bolts (not shown), which are fitted in a pair of left and right bolt fitting holes 21a provided in the cap 21 shown in FIG. 2, which is a view as viewed in the direction as indicated by an arrow mark II in FIG. 1, extend through bolt fitting holes 20b of the tensioner body 20 shown in FIG. 3 and are screwed in a lifter attaching portion 6a of a rear portion of the cylinder head 6 to mount the hydraulic tensioner 0 integrally on the cylinder head 6. As shown in FIGS. 4 to 6, a plunger accommodating hole 20a is formed in the tensioner body 20, and a plunger 23 is accommodated for sliding movement in the plunger accommodating hole 20a. Consequently, the tensioner body 20 plays a role as a plunger body.

Figure 3:
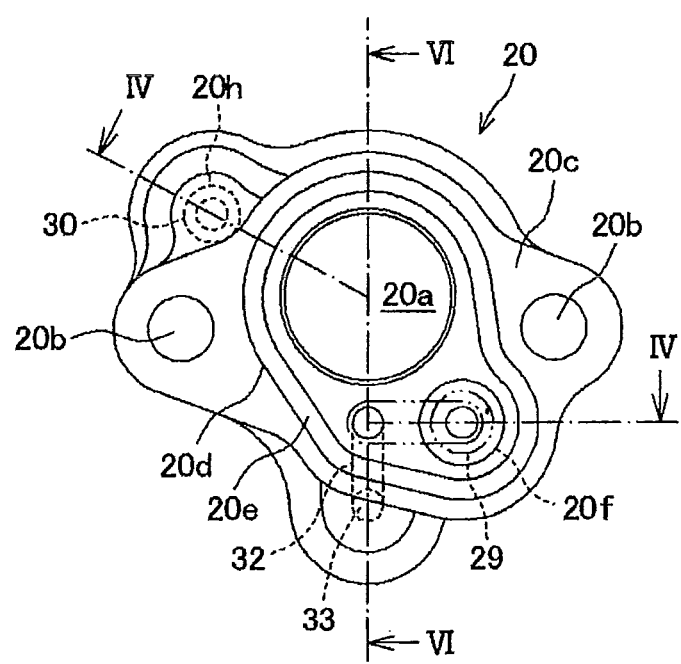
FIG. 3 is a rear elevational view of a tensioner body of the hydraulic tensioner as viewed in the direction indicated by the arrow mark II of FIG. 1

Further, as shown in FIG. 3, a packing fitting groove 20d is formed on a rear end face 20c of the tensioner body 20 in such a manner as to surround the plunger accommodating hole 20a, and an annular packing 20e is fitted in the packing fitting groove 20d. As shown in FIGS. 4 to 6, an oil reserving chamber 28 is configured from a rear end face 20c formed on a front end face 21b of the cap 21 and the rear end face 20c of the tensioner body 20.

Figure 7:
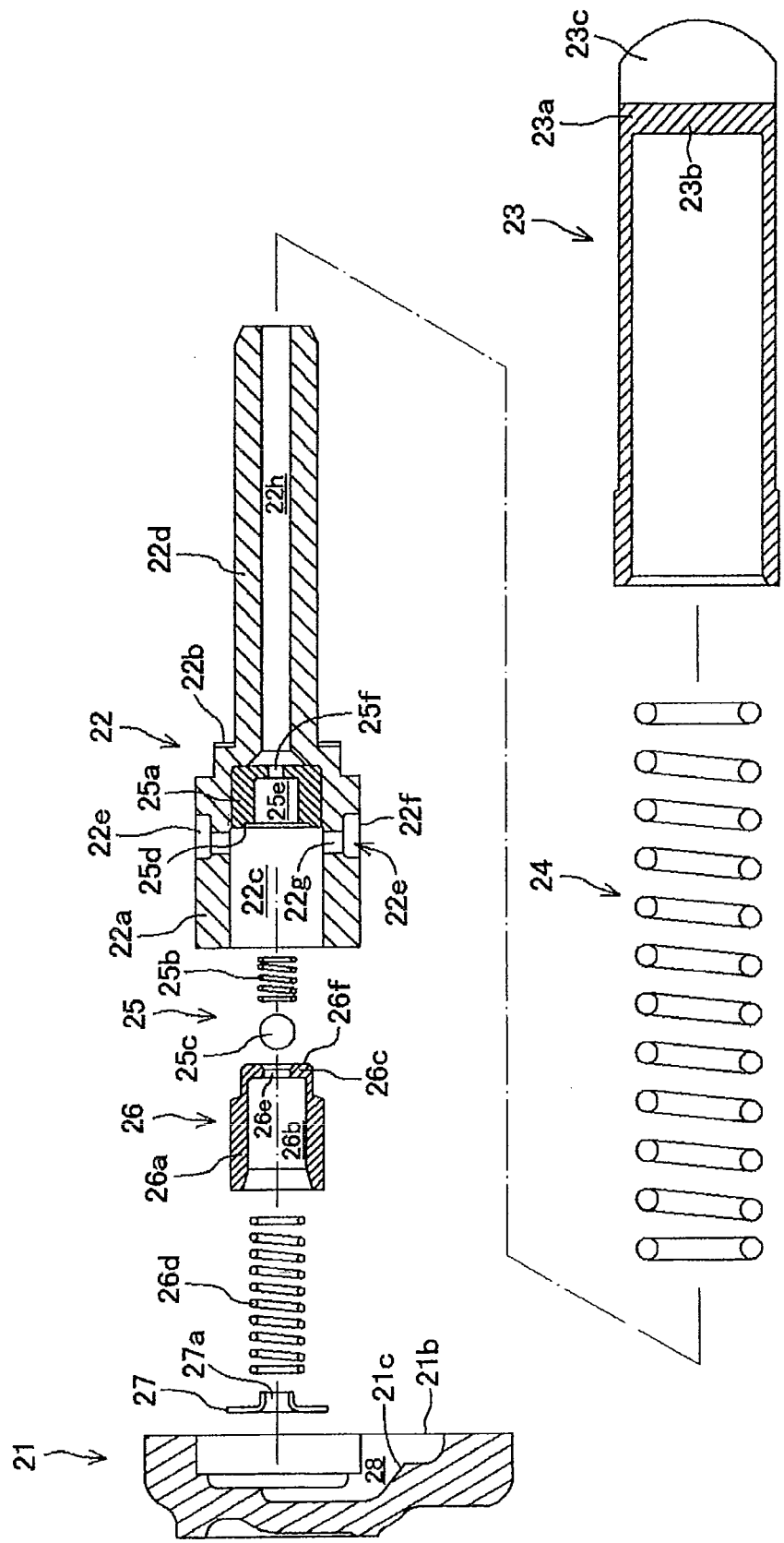
FIG. 7 is a fragmentary longitudinal sectional view of a check valve and a relief valve of the hydraulic tensioner.

Further, a base end portion 22a of a valve holder 22, formed in such a manner as shown in FIG. 7, is fitted in a rear portion of the plunger accommodating hole 20a of the tensioner body 20 as shown in FIGS. 4 to 6, and the plunger 23 is fitted for forward and backward sliding movement in the plunger accommodating hole 20a of the tensioner body 20. Further, in a high pressure oil chamber 31 in the plunger accommodating hole 20a and the plunger 23, a coil spring 24 as a biasing device is interposed between a stepped front end face 22b of the base end portion 22a of the valve holder 22 and an inner face 23b of a tip portion 23a of the plunger 23 such that the plunger 23 is biased so as to project forwardly by spring restoring force of the coil spring 24. It is to be noted that an abutting portion 23c is mounted integrally at the tip portion 23a of the plunger 23.

Furthermore, a valve guide 25a of a check valve 25 is fitted integrally at a front portion of a valve accommodating hole 22c (refer to FIG. 7) formed at the base end portion 22a of the valve holder 22. A check valve coil spring 25b and a spherical valve body 25c are fitted in order in the forward direction from the rear on the valve guide 25a.

Besides, a valve body 26a of a relief valve 26 is fitted for sliding movement in the valve accommodating hole 22c of the valve holder 22, and in a valve chamber 26b of the valve body 26a of the relief valve 26, a relief valve coil spring 26d is interposed between a relief valve seat 27 disposed adjacent the cap 21 in the oil reserving chamber 28 and a tip portion 26c of the valve body 26a of the relief valve 26. The oil reserving chamber 28 is connected to the high pressure oil chamber 31 through an opening 27a of the relief valve seat 27, relief valve 26 and check valve 25.

A pressure maintaining valve 29 will now be described.

As shown in FIG. 3 in which the tensioner body 20 is viewed from the rear of the vehicle body toward the front of the vehicle body, a pressure maintaining valve accommodating hole 20f is formed in parallel (refer to FIGS. 4 and 5) to the plunger accommodating hole 20a and positioned obliquely rightwardly downwards with respect to the plunger accommodating hole 20a. The pressure maintaining valve accommodating hole 20f is open at a rear end thereof to the oil reserving chamber 28 surrounded by the annular packing 20e.

Further, before the cap 21 is mounted on the tensioner body 20, a spring receiver 29a, a closing coil spring 29b and a valve body 29c of the pressure maintaining valve 29 are successively fitted through an opening of the pressure maintaining valve accommodating hole 20f of the tensioner body 20. A rear cylindrical circumferential face 29d of the valve body 29c is formed with a reduced diameter. The valve body 29c is biased rearwardly as shown in FIG. 4 by spring restoring force of the closing coil spring 29b so that a rear end face 29e of the rear cylindrical circumferential face 29d of the valve body 29c is abutted by the front end face 21b of the cap 21 to close up a communication port 20g of the tensioner body 20 which is in communication with a relief valve port 22e of the valve holder 22.

It is to be noted that the relief valve port 22e formed in the valve holder 22 is configured from a circumferential groove 22f formed on an outer circumferential face of the base end portion 22a, and a plurality of communication holes 22g formed on the bottom of the circumferential groove toward the center of the valve accommodating hole 22c in a spaced relationship from each other by an equal distance in the circumferential direction. If oil is relieved from the relief valve 26, then the oil flows from a relief path formed from the relief valve port 22e and the communication port 20g to a returning path formed from the outer circumferential face of the pressure maintaining valve 29 and the pressure maintaining valve accommodating hole 20f into the oil reserving chamber 28.

A purge valve 30 will now be described.

As shown in FIG. 3 in which the tensioner body 20 is viewed from the rear of the vehicle body toward the front, a purge valve accommodating hole 20h having a circular transverse section is formed in parallel to the plunger accommodating hole 20a at a position obliquely leftwardly upwards with respect to the plunger accommodating hole 20a. The purge valve accommodating hole 20h is in communication at a rear portion thereof with the high pressure oil chamber 31 through a purge path 30a as shown in FIGS. 4 and 5.

Figure 8:
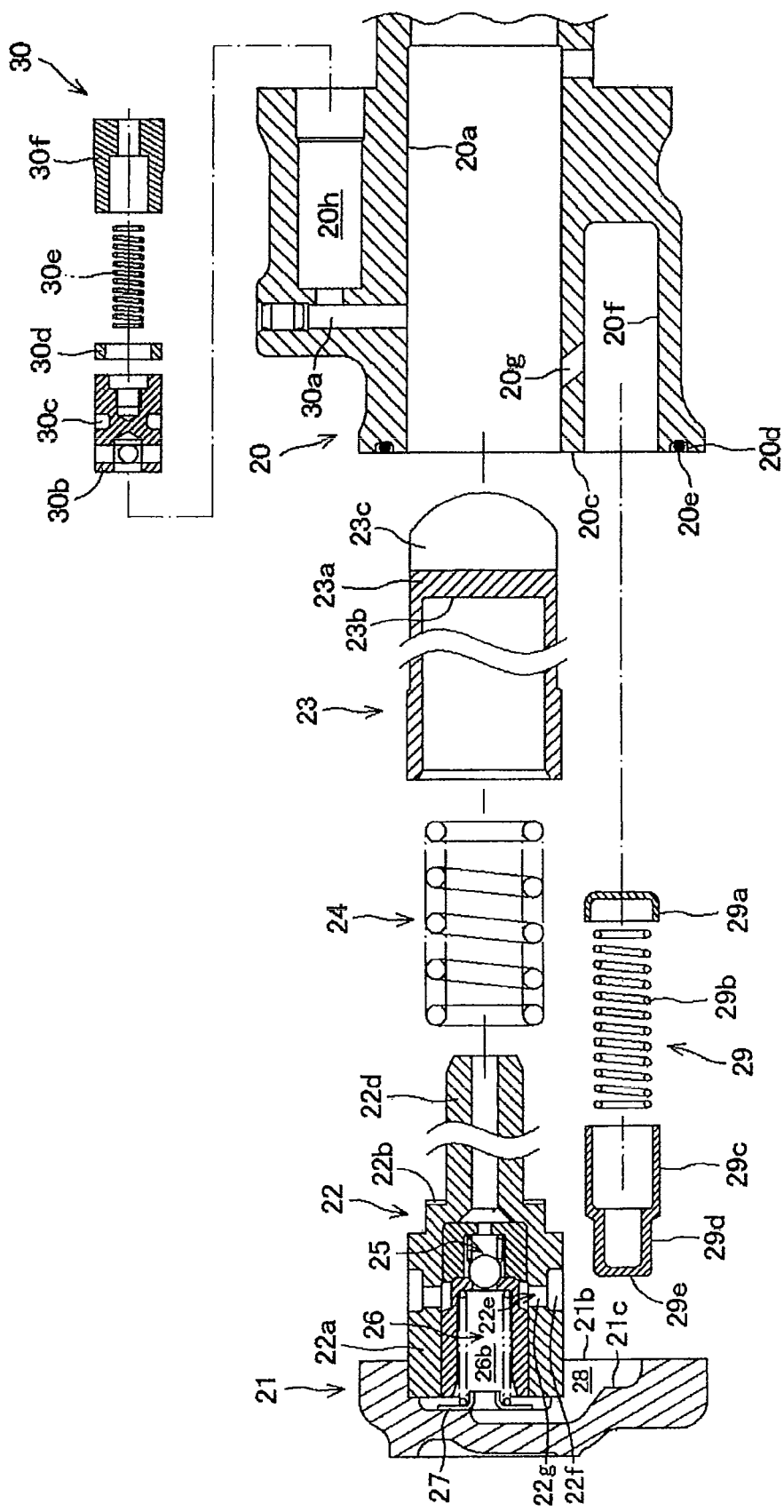
FIG. 8 is a fragmentary longitudinal sectional view in a state in which the check valve and the relief valve of the hydraulic tensioner are assembled to a valve holder and a purge valve is assembled to the tensioner body while a pressure maintaining valve is disassembled.

Further, as shown in FIG. 8, a valve body 30b, a coil spring 30e and a spring receiving tubular body 30f are fitted successively in the purge valve accommodating hole 20h from a front open end of the purge valve accommodating hole 20h. The spring receiving tubular body 30f is screwed integrally in the purge valve accommodating hole 20h.

Further, an annular groove 30c of a substantially rectangular (or square) cross section is formed on a circumferential face of the valve body 30b, and an annular valve body 30d having a substantially rectangular (or square) cross section is fitted in the annular groove 30c. If a pressure variation in the high pressure oil chamber 31 is transmitted to the valve body 30b through the purge path 30a, then the valve body 30b is moved back and forth in the forward and backward directions by the elastic restoring force of the coil spring 30e. Thereupon, air contained in the oil is separated from the oil and discharged into the atmospheric air.

Finally, an oil supplying system will be described.

As shown in FIG. 6, the oil reserving chamber 28 configured from the rear end face 20c of the tensioner body 20, concave face 21c of the cap 21 and rear end face 20c of the tensioner body 20 is connected at a lower portion thereof to a cylinder head oil path 33 formed in the lifter attaching portion 6a of the cylinder head 6 through a tensioner oil path 32 extending in a downwardly inclined relationship from a rear portion to a front portion through the tensioner body 20 as shown in FIGS. 3 and 6. As shown in FIG. 1, the cylinder head oil path 33 is connected to an oil filter 35 through an oil path 34 of the crankcase 4 through an oil path not shown in the cylinder block 5. The oil filter 35 is connected to a discharge port of an oil pump 37 through an oil path 36, and oil reserved on the bottom of the crankcase 4 is sucked into the oil pump 37 through a strainer 38 by the oil pump 37 which is placed into an operative state in an interlocking relationship with operation of the internal combustion engine 3. Oil discharged from the oil pump 37 is supplied to the oil reserving chamber 28 through the oil path 36, oil filter 35, oil path 34, cylinder head oil path 33 and tensioner oil path 32.

In the present embodiment, an oil supply path 40 signifies a path up to a valve hole 26e configured from the tensioner oil path 32, the oil reserving chamber 28 and the valve chamber 26b of the relief valve 26.

In the embodiment shown in FIGS. 1 to 8, if the internal combustion engine 3 starts its operation, then the oil pump 37 is placed into an operative state, and oil is fed from the discharge port of the oil pump 37 to the cylinder head oil path 33 of the lifter attaching portion 6a of the cylinder head 6 as described hereinabove. Then, the oil is fed into the oil reserving chamber 28 through the tensioner oil path 32 of the tensioner body 20 as shown in FIG. 6 and flows into the valve chamber 26b of the relief valve 26 from the opening 27a of the relief valve seat 27.

If the pressure in the oil reserving chamber 28 rises and exceeds a cracking pressure, then the check valve 25 is opened and the oil flows into the high pressure oil chamber 31 through the valve hole 26e of the relief valve 26, whereupon the plunger 23 is projected forwardly until the abutting portion 23c of the plunger 23 is abutted with the tensioner slipper 15. Then, the plunger 23 forwardly pushes the tensioner slipper 15 strongly with the oil pressure in the high pressure oil chamber 31 to place the endless timing chain 13 on the relax side into a tensioned state thereby to suppress flapping of the endless timing chain 13.

On the other hand, in a state in which the internal combustion engine 3 stops and the oil pressure in the oil reserving chamber 28 is low, the pressure maintaining valve 29 is closed by the spring restoring force of the closing coil spring 29b of the pressure maintaining valve 29 as shown in FIG. 4. However, if the oil pressure in the oil reserving chamber 28 rises in an interlocking relationship with starting of the internal combustion engine 3, then it overcomes the spring restoring force of the closing coil spring 29b thereby to push the valve body 29c of the pressure maintaining valve 29 forwardly so that the rear cylindrical circumferential face 29d of the reduced diameter of the pressure maintaining valve 29 approaches the communication port 20g of the tensioner body 20. Then, when the communication port 20g is opened as shown in FIG. 5, the oil flows into the relief valve port 22e of the valve holder 22.

If, in such a state as just described, the tensioner slipper 15 is tilted rearwardly and the plunger 23 is pushed back strongly by variations of the rotating torque of the driving sprocket wheel 10 by an intermittent pressure rise of the pressure in the fuel chambers in the internal combustion engine 3 or the like, then the oil pressure in the high pressure oil chamber 31 rises, whereupon the valve body 26a of the relief valve 26 moves rearwardly. Consequently, an abutting face 26f of the relief valve 26 is spaced away from a valve seat 25d of the check valve 25, whereupon the oil in a valve chamber 25e of the check valve 25 flows from between the valve seat 25d and the abutting face 26f of the tip portion 26c of the relief valve 26 back into the oil reserving chamber 28 through the relief valve port 22e of the valve holder 22 and the communication port 20g and the pressure maintaining valve accommodating hole 20f of the tensioner body 20. Consequently, an extraordinary increase in tension of the endless timing chain 13 is inhibited and flapping of the tensioner slipper 15 is suppressed.

Further, in the hydraulic tensioner disclosed in Japanese Patent Laid-Open No. 2009-180359 described hereinabove, since the pressure maintaining valve and the check valve are connected in series, oil fed from the discharge port of the oil pump cannot flow into the high pressure oil chamber if it does not pass through the check valve after it passes through the pressure maintaining valve. However, in the present embodiment, since the pressure maintaining valve 29 and the check valve 25 are connected in parallel to each other, even in a state in which the pressure maintaining valve 29 is closed, if the check valve 25 is opened, then the oil can flow into the high pressure oil chamber 31. Therefore, in immediate response to starting of the internal combustion engine 3, the oil is supplied into the high pressure oil chamber 31. Consequently, the starting responsibility of the hydraulic tensioner 0 is improved, and the internal combustion engine 3 can start its operation smoothly.

Further, in the hydraulic tensioner disclosed in Japanese Patent Laid-Open No. 2009-180359 1 described hereinabove, the check valve is not opened until after oil pressure from the oil pump has been fed by a volume equal to the product of the area of the transverse section of the valve hole of the pressure maintaining valve and the stroke necessary for opening of the pressure maintaining valve. Therefore, the hydraulic tensioner cannot exhibit its function. However, in the present embodiment, if the check valve 25 is opened, then the hydraulic tensioner 0 can immediate exhibit its function independently of the opening of the pressure maintaining valve 29. Therefore, the hydraulic tensioner of the present embodiment can exhibit its superior function sufficiently particularly in a hybrid vehicle wherein operation of the internal combustion engine 3 stops when the vehicle stops.

Furthermore, in the hydraulic tensioner disclosed in Japanese Patent Laid-Open No. 2009-180359 described hereinabove, the pressure maintaining valve is disposed on the oil pump side with respect to the check valve and the relief valve, and the pressure in the high pressure oil chamber acts upon the pressure maintaining valve. Therefore, the pressure maintaining valve requires a sealing property equivalent to that of the check valve, and consequently, there is the possibility that the cost may increase. However, in the present embodiment, since the pressure maintaining valve 29 is disposed in parallel to the check valve 25 and the relief valve 26, it does not require a high sealing property and is advantageous in terms of the cost.

Figures 9, 10:
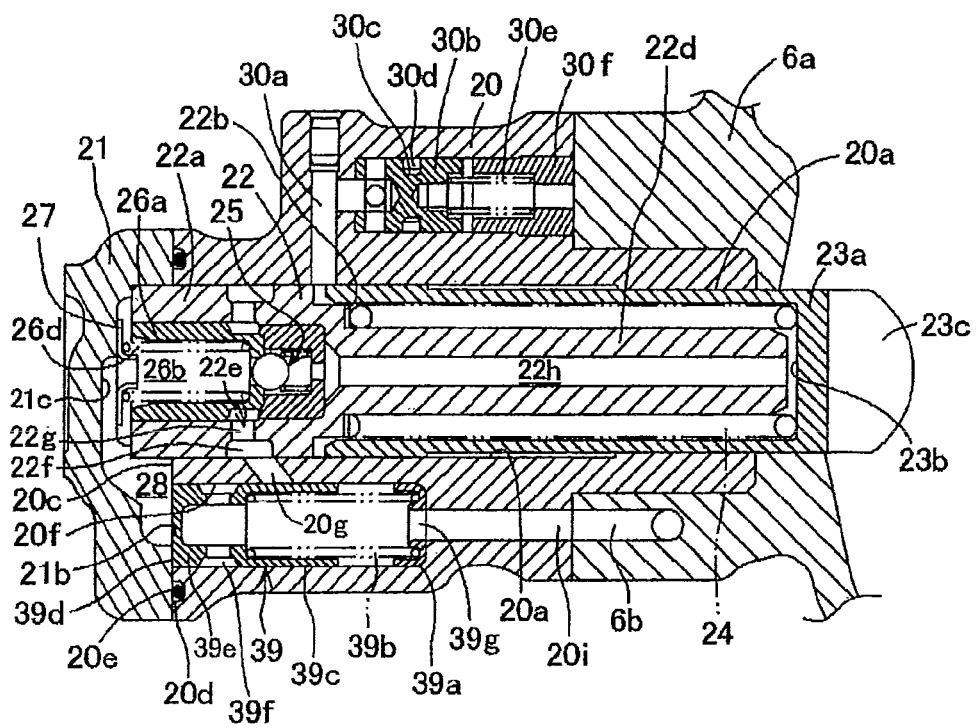
FIG. 9 is a vertical sectional view of a hydraulic tensioner of another embodiment of the present invention and is a vertical sectional view taken along a plane similar to that of FIG. 4.
FIG. 10 is a vertical sectional view of the hydraulic tensioner of the embodiment shown in FIG. 9 and is a vertical sectional view taken along a plane similar to that of FIG. 5.

A second embodiment of the present invention shown in FIGS. 9 and 10 will be described.

A pressure maintaining valve 39 is used in place of the pressure maintaining valve 29 shown in FIGS. 1 to 8. In this pressure maintaining valve 39, a pressure maintaining valve port 39f is formed on an outer circumferential portion 39e of a valve head portion 39d of a valve body 39c, and a communication hole 39g is formed in a spring receiver 39a. This communication hole 39g is in communication with an oil draining path 6b of the cylinder head 6 through a drain oil path 20i of the rear end face 20c, and the spring receiver 39a, a closing coil spring 39b and the valve body 39c are successively fitted through an opening of the pressure maintaining valve accommodating hole 20f. Where the oil pressure in the oil reserving chamber 28 is lower than a predetermined pressure, the valve head portion 39d is abutted with the front end face 21b of the cap 21 under the spring restoring force of the closing coil spring 39b of the pressure maintaining valve 39 as shown in FIG. 9. Consequently, the communication between the pressure maintaining valve port 39f provided in the valve head portion 39d and the communication port 20g of the valve holder 22 is blocked.

However, if the rotational frequency of the oil pump 37 increases until the check valve 25 is opened by the increasing oil pressure in the oil reserving chamber 28, then the oil is supplied into the high pressure oil chamber 31 and the plunger 23 is projected to push the tensioner slipper 15 sufficiently so that suitable tension can be applied to the endless timing chain 13. In this state, the increasing oil pressure in the oil reserving chamber 28 is transmitted to the pressure maintaining valve accommodating hole 20f, and by the oil pressure, the pressure maintaining valve port 39f of the pressure maintaining valve 39 is in communication with the communication port 20g and the relief valve port 22e. Therefore, when the oil pressure in the high pressure oil chamber 31 exceeds the relief pressure of the relief valve 26, the relief valve 26 is opened, and the oil in the high pressure oil chamber 31 is fed to the oil draining path 6b through the drain oil path 20i passing the relief path configured from the relief valve port 22e, communication port 20g, pressure maintaining valve port 39f and communication hole 39g from the relief valve 26. Meanwhile, the oil in the high pressure oil chamber 31 whose pressure exceeds the relief pressure of the relief valve 26 is discharged into the space in the internal combustion engine from the oil draining path 6b irrespective of the oil in the oil reserving chamber 28. As a result, extraordinary tension to the endless timing chain 13 can be prevented.

Also in the present embodiment, similarly as in the embodiment of FIGS. 1 to 8, the circuit which establishes communication from the oil reserving chamber 28 to the pressure maintaining valve accommodating hole 20f of the pressure maintaining valve 39 is connected in parallel to the circuit which establishes communication from the oil reserving chamber 28 to the high pressure oil chamber 31 through the valve chamber 26b of the relief valve 26, valve chamber 25e of the check valve 25 and relief valve port 22e. Therefore, this point provides effects similar to those in the first embodiment.

In the first and second embodiments described above, in the state in which the oil pump 37 stops, oil released from the high pressure oil chamber 31 by the relief valve 26 is filled only between the downstream of the check valve 25 and the relief valve port 22e and communication port 20g which form the relief path communicating with the pressure maintaining valve 29 and the pressure maintaining valve 39, and the pressure is maintained. Consequently, the oil pressure in the relief valve 26 is equal to the oil pressure in the oil supply path 40. Therefore, oil of a high pressure is not filled, and consequently, the relief valve 26 does not require a high sealing property. This makes it possible to achieve reduction of the cost.

Further, in the state in which the pressure maintaining valves 29 and 39 are acted upon by oil pressure from the oil reserving chamber 28, the relief valve port 22e and the communicating port 20g which form the relief path and the oil supply path 40 are in communication with each other and oil is circulated. Consequently, insufficient supply of oil to the hydraulic tensioner 0 is suppressed.

Furthermore, only by partly modifying the shape of the valve bodies 29c and 39c of the pressure maintaining valves 29 and 39, the returning path can be configured in a simplified structure.

Furthermore, since oil is not returned to the oil reserving chamber 28 side, an increase of the oil pressure in the oil supply path 40 is suppressed, and the necessity to raise the sealing property of the check valve 25, relief valve 26 and pressure maintaining valves 29 and 39 is eliminated and reduction of the cost of the hydraulic tensioner 0 can be anticipated.

Besides, since the valve bodies 29c and 39c of the pressure maintaining valves 29 and 39 have a simple cylindrical shape, also the pressure maintaining valve accommodating hole 20f between the relief valve port 22e and communication port 20g and the drain oil path 20i of the tensioner body 20 may be formed in a simple shape. Besides, since the pressure maintaining valve 39 is structured such that high pressure relief oil is discharged into the drain oil path 20i through the inside of the valve body 39c of the pressure maintaining valve 39, the drain oil path 20i is simplified and reduction of the cost can be anticipated.

Further, since the oil supply path 40 can be configured utilizing the valve holder 22, the oil supply path 40 is simplified and reduction of the cost can be anticipated.

Furthermore, supply oil can be supplied smoothly into the hydraulic tensioner 0 through an opening 7a formed in the relief valve seat 27 serving as a holding plate.

Furthermore, in the relief valve port 22e formed in the valve holder 22, a converging discharge path is configured from a plurality of communicating holes directed in radial directions from the valve accommodating hole 22c and a circumferential groove formed on an outer circumferential face of the base end portion 22a in a communicating relationship with the communicating holes. Therefore, a simple oil path can be configured from the single pressure maintaining valve 29 or 39 by disposing the pressure maintaining valve 29 or 39 such that it is connected to the converging discharge path.

Figure 11:
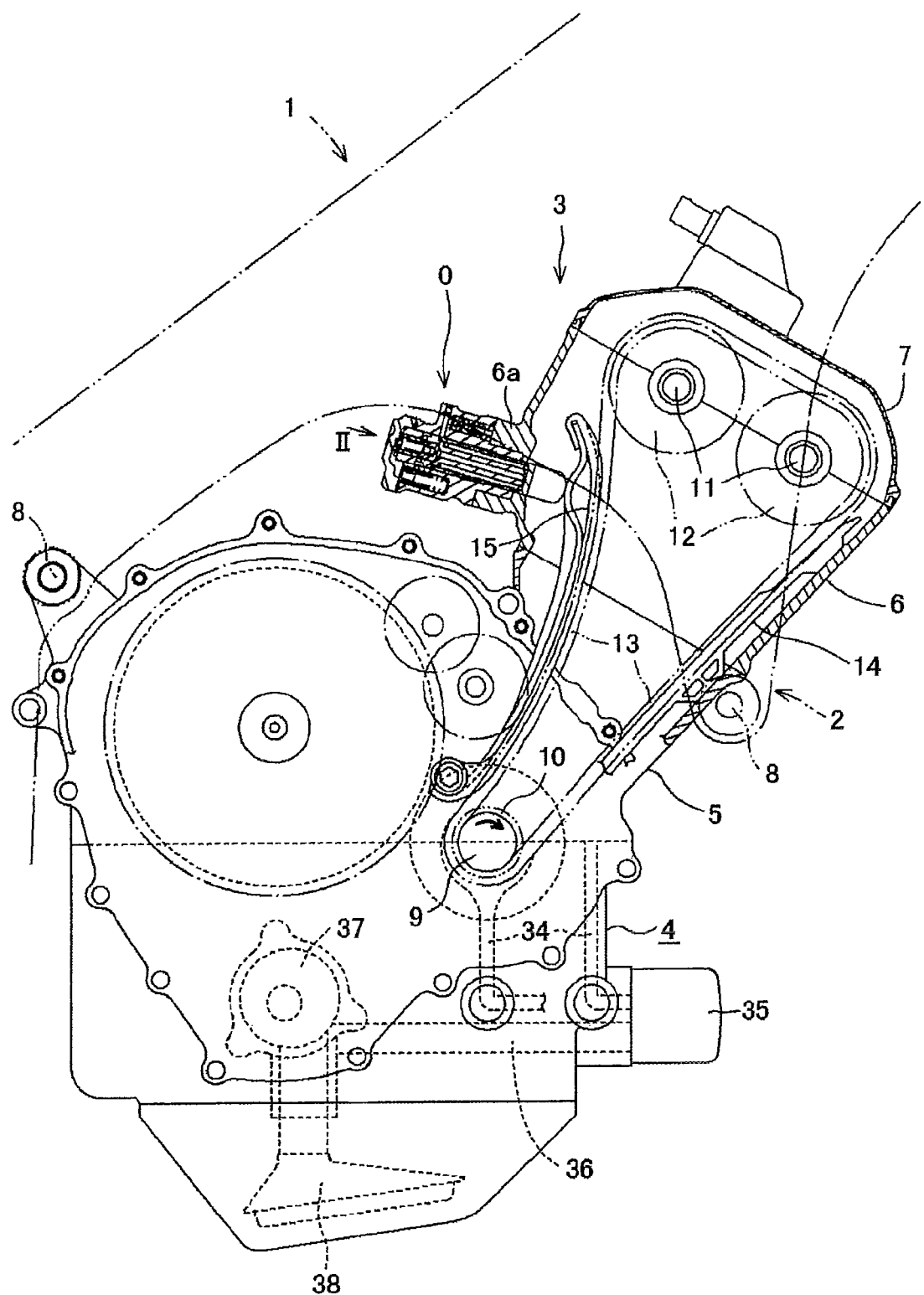
FIG. 11 is a right side elevational view of essential part illustrating a state in which an internal combustion engine including a hydraulic tensioner is attached to a vehicle body frame of a motorcycle.

FIG. 11 is a right side elevational view of essential part illustrating a state in which an internal combustion engine 3 which includes a hydraulic tensioner 0 is attached to a vehicle body frame 1 of a motorcycle. In FIG. 11, the rightward direction is the forward direction of the vehicle. Referring to FIG. 11, the four-stroke cycle DOHC internal combustion engine 3 which includes the hydraulic tensioner 0 is incorporated in the motorcycle. The internal combustion engine 3 is attached to a hanger 2 provided at a front portion of the vehicle body frame 1 of the motorcycle and a rear portion of the vehicle body frame 1 through two bosses 8 projecting from the internal combustion engine 3.

In the internal combustion engine 3, a cylinder block 5, a cylinder head 6 and a head cover 7 are successively placed in order in the upward direction on a crankcase 4 and are coupled integrally by a coupling device such as bolts. A crankshaft 9 is supported for rotation at a position sandwiched between the crankcase 4 and the cylinder block 5 of the internal combustion engine 3. A pair of camshafts 11 is supported for rotation on the cylinder head 6 in the cylinder head 6 and the head cover 7. An endless timing chain 13 extends between and around a driving sprocket wheel 10, which is integrated with the crankshaft 9, and a driven sprocket wheel 12, which is integrated with the paired camshafts 11. The crankshaft 9 is driven to rotate by upward and downward movement of pistons fitted for sliding movement in cylinder bores of the cylinder block 5, and rotating torque of the crankshaft 9 is transmitted to the paired camshafts 11 through the driving sprocket wheel 10, endless timing chain 13 and driven sprocket wheel 12 so that intake and exhaust valves are driven for opening and closing movement.

In the four-stroke cycle internal combustion engine 3, fuel in a combustion chamber burns every time the crankshaft 9 rotates twice, and the pistons are intermittently pushed toward the crankshaft 9 by pressure of the combustion gas. Further, since the traveling resistance varies in response to concaves and convexes of the road surface on which the motorcycle travels, the tension state of the endless timing chain 13 varies and the endless timing chain 13 is liable to flap in the forward and backward directions. In order to prevent this, a chain guide 14 is disposed in contact with the endless timing chain 13 on the tension side positioned rightwardly (forwardly of the vehicle) in FIG. 11 while a tensioner slipper 15 is disposed in contact with the endless timing chain 13 on the relax side positioned leftwardly (rearwardly of the vehicle) in FIG. 11. Further, the hydraulic tensioner 0 is assembled to the cylinder head 6 rearwardly of and adjacent to the tensioner slipper 15. By a characteristic of the hydraulic tensioner 0, flapping of the endless timing chain 13 on the relax side can be suppressed effectively.

Figure 12:
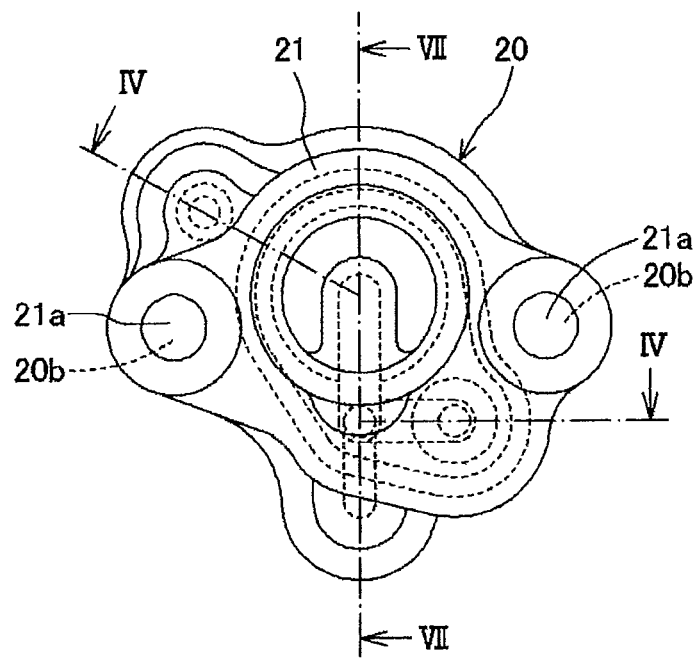
FIG. 12 is a rear elevational view of the tensioner, particularly a view as viewed in the direction indicated by an arrow mark II of FIG. 11.
Figure 14:
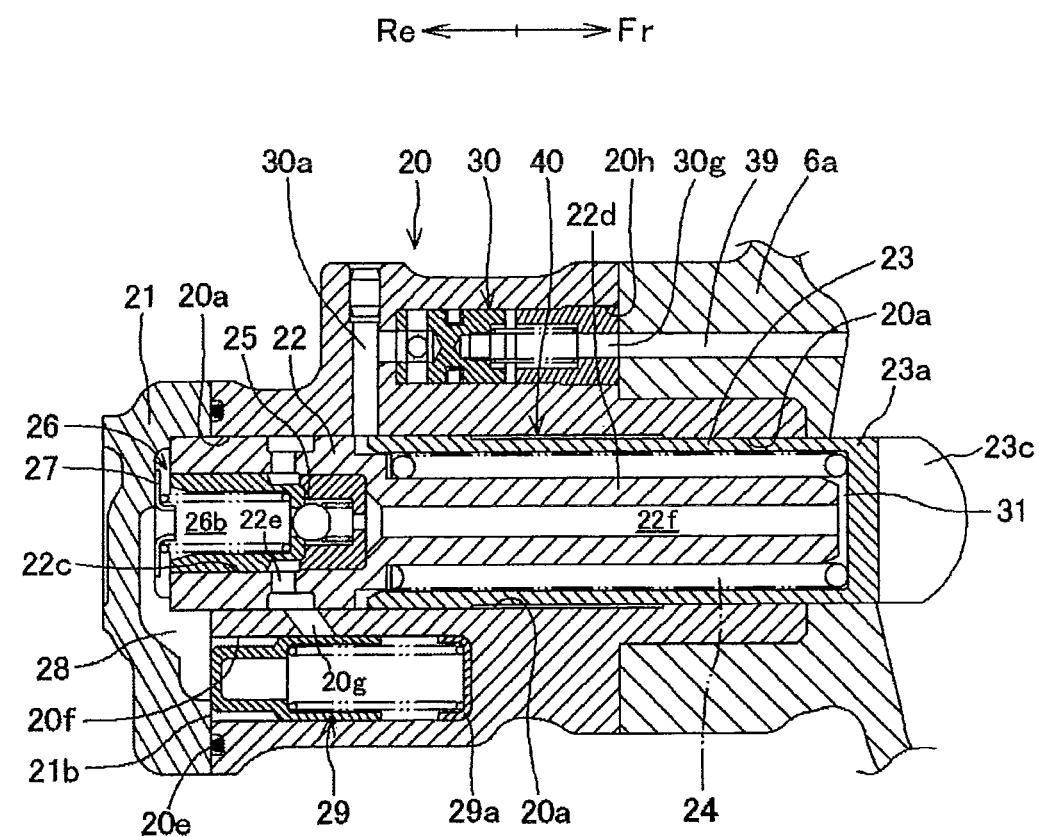
FIG. 14 is a vertical sectional view taken along line IV-IV of FIG. 12 and is a longitudinal sectional view of the tensioner.

FIG. 12 is a rear elevational view of the tensioner 0, that is, a view as viewed in the direction indicated by an arrow mark II of FIG. 11. The shell of the hydraulic tensioner 0 is configured from a tensioner body 20 and a cap 21 (FIGS. 12 and 14). The cap 21 has a pair of left and right bolt fitting holes 21a provided therein.

Figure 13:
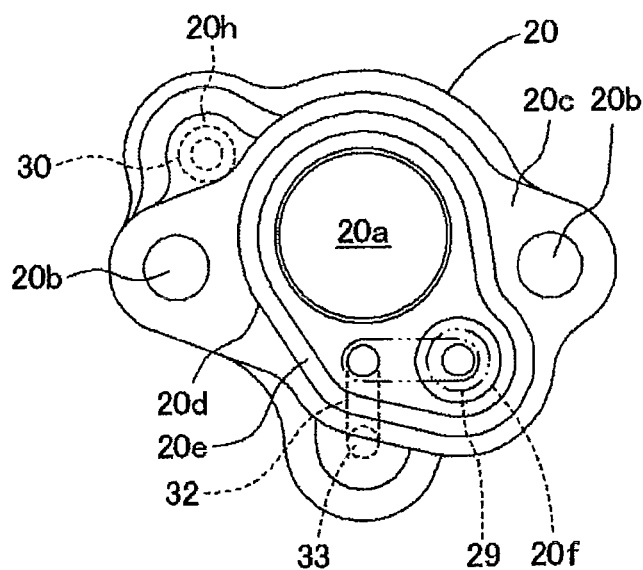
FIG. 13 is a view of a tensioner body as viewed from the rear.

FIG. 13 is a view of the tensioner body 20 as viewed from the rear with the cap 21 removed. Bolts not shown which are fitted in the paired left and right bolt fitting holes 21a (FIG. 12) provided in the cap 21 shown extend through bolt fitting holes 20b (FIG. 13) of the tensioner body 20 and are screwed in a tensioner attaching portion 6a (FIG. 11) of a rear portion of the cylinder head 6 to mount the hydraulic tensioner 0 integrally on the cylinder head 6. In FIG. 13, a plunger accommodating hole 20a (FIG. 13) in which a plunger 23 and a valve holder 22 (FIG. 14) are fitted extends through the center of the tensioner body 20.

FIG. 14 is a sectional view taken along line Iv-Iv of FIG. 12 and is a longitudinal sectional view of the tensioner 0. Arrow marks Fr and Re indicate directions as forward and backward directions of the tensioner itself in order to indicate the positions of the member of the tensioner 0, and Fr indicates the forward direction and Re indicates the rearward direction. The shell of the tensioner 0 is configured from the tensioner body 20 and the cap 21. In a state in which the cap is removed, a plunger 23, a coil spring 24 and a valve holder 22 are successively mounted from the rear end side of the tensioner body 20 in the plunger accommodating hole 20a provided at a central portion of the tensioner body 20. The plunger 23 is slidable forwardly and backwardly in the plunger accommodating hole 20a. The plunger 23 is biased so as to project forwardly by spring restoring force of the coil spring 24. It is to be noted that an abutting portion 23c is integrally mounted at a tip portion 23a of the plunger 23.

A check valve 25, a relief valve 26 and a relief valve seat 27 are successively mounted in a valve accommodating hole 22c (FIG. 15) formed at a base end portion 22a (FIG. 15) of the valve holder 22. A pressure maintaining valve 29 is mounted from a rear end of the tensioner body 20 in a pressure maintaining valve accommodating hole 20f provided at a lower portion of the tensioner body 20. A purge valve 30 is mounted from a front portion of a purge valve accommodating hole 20h (FIG. 13) provided at an upper portion of the tensioner body 20. An oil reserving chamber 28 is defined by and between an inner face of the cap 21 and a rear end of the valve holder 22. The circumference of the oil reserving chamber 28 is surrounded by an annular packing 20e (FIG. 13) fitted in a packing fitting groove 20d (FIG. 13). A high pressure oil chamber 31 is defined by and between an inner face of the plunger 23 and an outer face of a coil spring holding body 22d of the valve holder 22.

Figure 15:
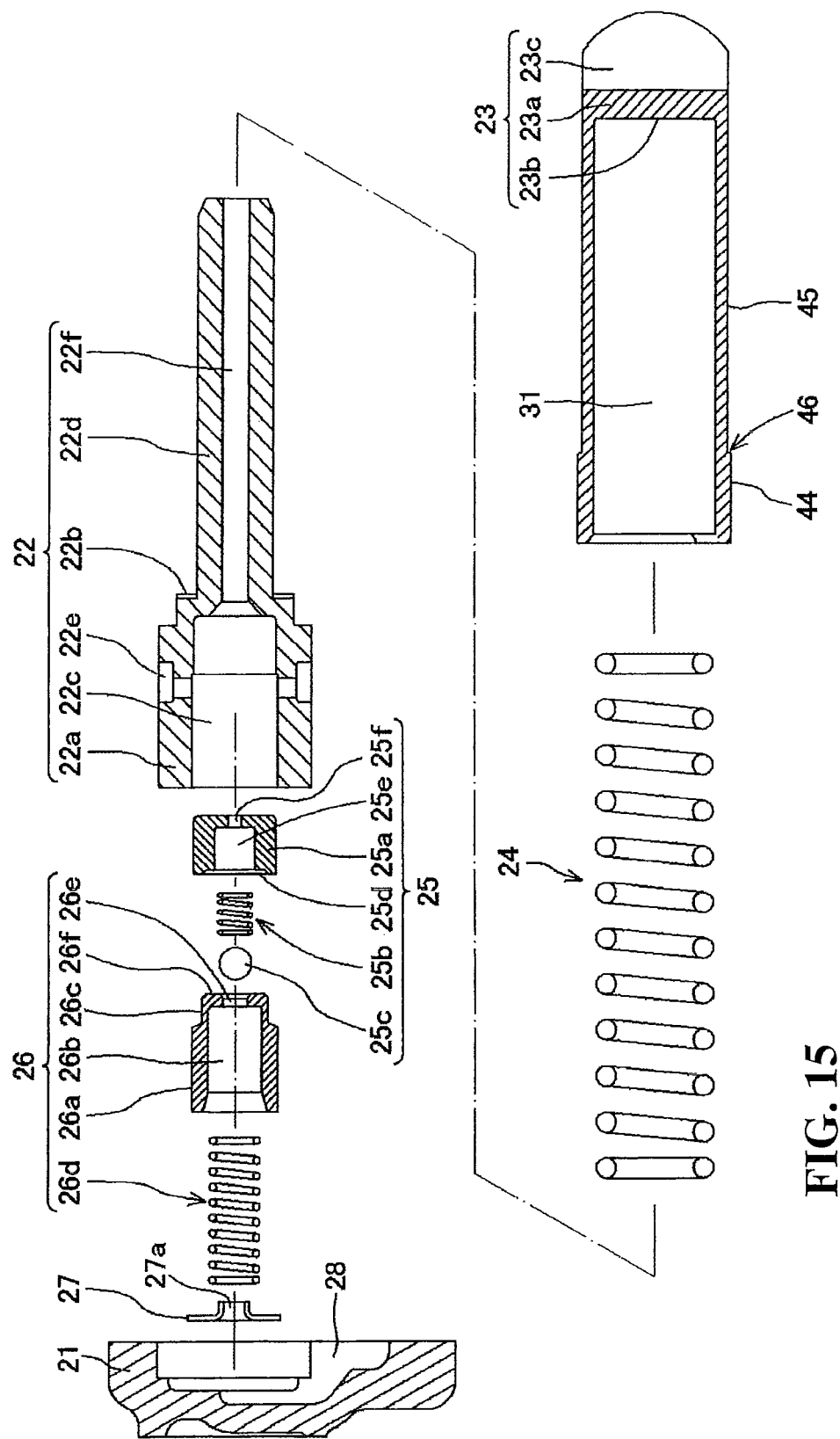
FIG. 15 is a fragmentary perspective view of a plunger, a valve holder, a check valve, a relief valve and so forth inserted in a plunger accommodating hole.

FIG. 15 is a fragmentary perspective view of the plunger 23, coil spring 24, valve holder 22, check valve 25, relief valve 26, relief valve seat 27 and cap 21 inserted in the plunger accommodating hole 20a. The coil spring 24 is interposed between an inner face 23b of the tip portion 23a of the plunger 23 and a stepped portion front end face 22b of the valve holder 22. A valve guide 25a of the check valve 25 is fitted at a front portion of the valve accommodating hole 22c formed in the base end portion 22a of the valve holder 22. A check valve coil spring 25b and a spherical valve body 25c are successively fitted in the forward direction from a rear portion with the valve guide 25a.

A valve body 26a of the relief valve 26 is fitted for sliding movement in a rear portion of the valve accommodating hole 22c, and a relief valve coil spring 26d is interposed between the relief valve seat 27 disposed in the oil reserving chamber 28 and a tip portion 26c of the valve body 26a of the relief valve 26 in a valve chamber 26b of the valve body 26a of the relief valve 26. The oil reserving chamber 28 is connected to the high pressure oil chamber 31 through an opening 27a of the relief valve seat 27, the relief valve 26, the check valve 25 and a through-hole 22f of the coil spring holding body 22d of the valve holder 22.

Referring to FIG. 13, the pressure maintaining valve accommodating hole 20f is formed in parallel to the plunger accommodating hole 20a and positioned obliquely rightwardly downwards with respect to the plunger accommodating hole 20a, and the pressure maintaining valve 29 is accommodated in the pressure maintaining valve accommodating hole 20f. The pressure maintaining valve accommodating hole 20f is open at a rear end thereof to the oil reserving chamber 28 (FIG. 14) surrounded by the annular packing 20e.

Figure 16:
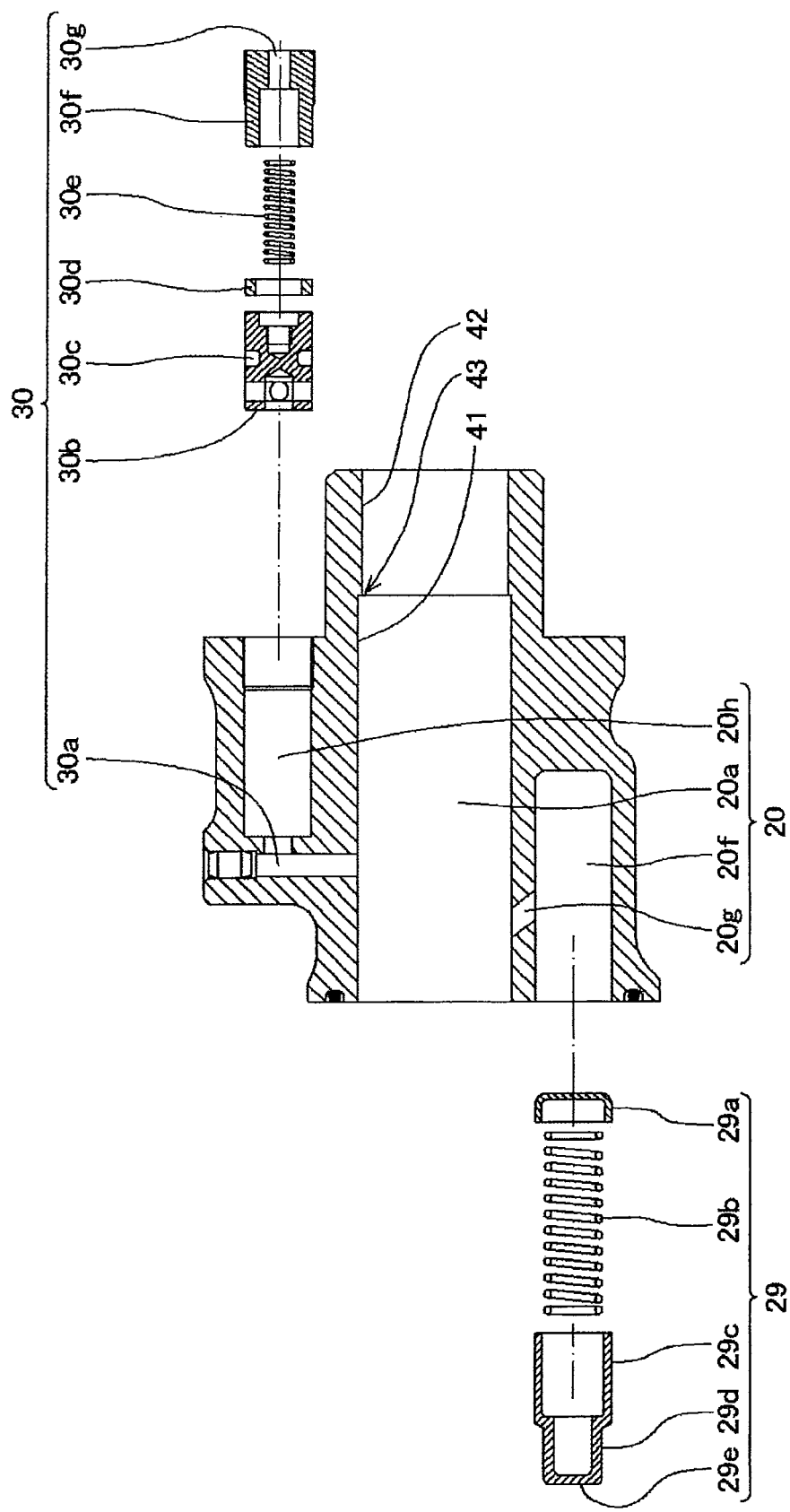
FIG. 16 is a view illustrating a disassembled state of a pressure maintaining valve and a purge valve.

FIG. 16 illustrates a disassembled state of the pressure maintaining valve 29. In a state in which the cap is removed, a spring receiver 29a, a closing coil spring 29b and a valve body 29c of the pressure maintaining valve 29 are successively fitted from the opening of the pressure maintaining valve accommodating hole 20f of the tensioner body 20. A rear cylindrical circumferential face 29d of the valve body 29c is formed with a reduced diameter. The valve body 29c is biased rearwardly as illustrated in FIG. 14 by spring restoring force of the closing coil spring 29b until a rear end face 29e of the rear cylindrical circumferential face 29d of the valve body 29c is abutted with a front end face 21b (FIG. 14) of the cap 21. Consequently, a communication port 20g (FIGS. 4 and 6) of the tensioner body 20 which is in communication with the relief valve port 22e (FIGS. 4 and 5) of the valve holder 22 is closed up. It is to be noted that the relief valve port 22e formed in the valve holder 22 is configured from a circumferential groove formed on an outer circumferential face of the base end portion 22a and a plurality of communicating holes formed toward the center of the valve accommodating hole 22c in an equally spaced relationship from each other in the circumferential direction on the bottom of the circumferential groove.

Referring to FIG. 13, the purge valve accommodating hole 20h having a circular transverse section is formed in parallel to the plunger accommodating hole 20a obliquely leftwardly upwards with respect to the plunger accommodating hole 20a, and the purge valve 30 is accommodated in the purge valve accommodating hole 20h. The purge valve accommodating hole 20h is communicated at a rear portion thereof with the high pressure oil chamber 31 through a purge path 30a as shown in FIG. 14.

FIG. 16 illustrates a disassembled state of the purge valve 30. A valve body 30b, a coil spring 30e and a spring receiving tubular body 30f are fitted successively in the purge valve accommodating hole 20h from a front open end of the purge valve accommodating hole 20h. The spring receiving tubular body 30f is screwed integrally in the purge valve accommodating hole 20h. An annular groove 30c of a substantially rectangular cross section is formed on a circumferential face of the valve body 30b, and an annular valve body 30d having a substantially rectangular cross section is fitted in the annular groove 30c. If a pressure variation in the high pressure oil chamber 31 is transmitted to the valve body 30b through the purge path 30a, then the valve body 30b is moved back and forth in the forward and backward directions by the elastic restoring force of the coil spring 30e. Thereupon, air contained in the oil is separated from the oil and discharged to the outside from a front opening 30g (FIG. 14) of the purge valve 30 and an air emitting path 39 (FIG. 14) of the tensioner attaching portion 6a through a gap between the annular groove 30c and the annular valve body 30d.

Figure 17:
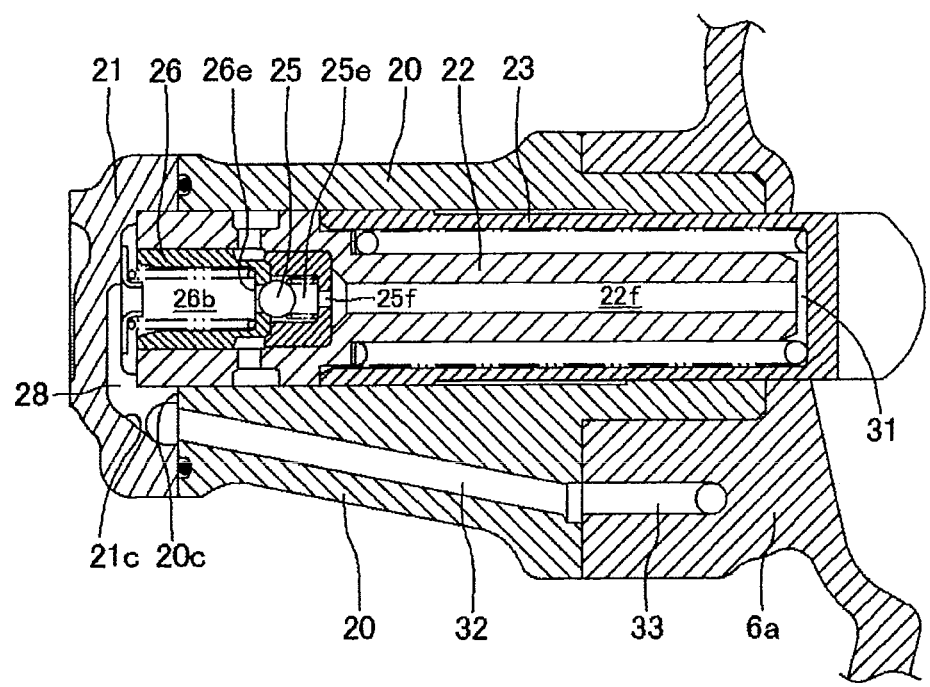
FIG. 17 is a sectional view taken along line VII-VII of FIG. 12.

FIG. 17 is a sectional view taken along line VII-VII of FIG. 12. A tensioner oil path 32 (refer also to FIG. 13) is provided at a lower portion of the oil reserving chamber 28 configured from a rear end face 20c of the tensioner body 20 and a concave face 21c of the cap 21 and extends forwardly in a downwardly inclined relationship from the tensioner body 20 through the tensioner body 20. This path 32 is connected to a cylinder head oil path 33 formed in the tensioner attaching portion 6a of the cylinder head 6. As shown in FIG. 11, the cylinder head oil path 33 is connected to an oil filter 35 through an oil path not shown in the cylinder block 5 and through an oil path 34 of the crankcase 4. The oil filter 35 is connected to a discharge port of an oil pump 37 through an oil path 36, and oil reserved on the bottom portion of the crankcase 4 is sucked into the oil pump 37 through a strainer 38 by the oil pump 37 which is placed into an operative state in an interlocking relationship with operation of the internal combustion engine 3. The oil discharged from the oil pump 37 is supplied into the oil reserving chamber 28 of the hydraulic tensioner 0 through the oil path 36, the oil filter 35, the oil path 34, the cylinder head oil path 33 and the tensioner oil path 32. Further, the oil is supplied from the oil reserving chamber 28 into the high pressure oil chamber 31 of the tensioner through the valve chamber 26b and a valve hole 26e of the relief valve 26, a valve chamber 25e and an opening 25f of the check valve 25 and the through-hole 22f of the valve holder 22 to drive the plunger 23.

Figure 18:
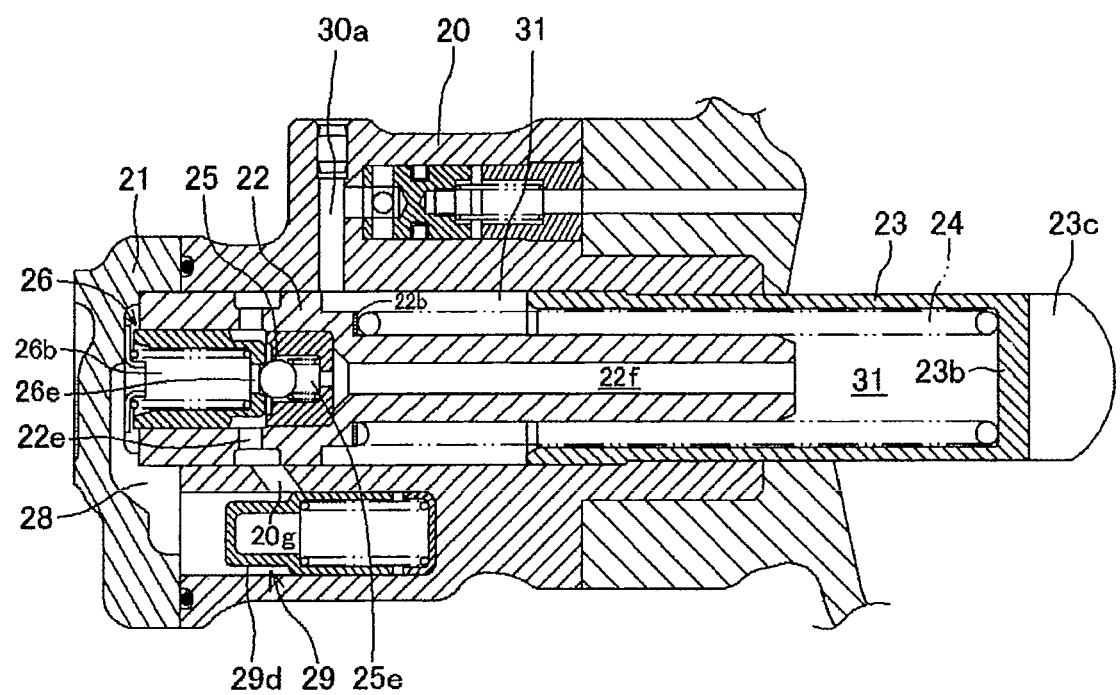
FIG. 18 is a view illustrating a state in which the pressure in an oil reserving chamber rises to project the plunger forwardly.

FIG. 18 illustrates a state in which the plunger 23 is projected forwardly when the pressure in the oil reserving chamber 28 rises and exceeds a cracking pressure to open the check valve 25 and the oil flows into the high pressure oil chamber 31 from the valve hole 26e of the relief valve 26 through the valve chamber 25e and opening 25f of the check valve 25 and the through-hole 22f of the valve holder 22. Then, the abutting portion 23c of the plunger 23 is abutted with the tensioner slipper 15 to push forwardly the tensioner slipper 15 (FIG. 11) strongly with the oil pressure in the high pressure oil chamber 31 to place the endless timing chain 13 on the relax side into a tensioned state thereby to suppress flapping of the endless timing chain 13.

In a state in which the internal combustion engine 3 stops and the oil pressure in the oil reserving chamber 28 is low, the pressure maintaining valve 29 is closed by the spring restoring force of the closing coil spring 29b of the pressure maintaining valve 29 as shown in FIG. 14. However, if the oil pressure in the oil reserving chamber 28 rises in an interlocking relationship with starting of the internal combustion engine 3, then it overcomes the spring restoring force of the closing coil spring 29b thereby to push the valve body 29c of the pressure maintaining valve 29 forwardly so that the rear cylindrical circumferential face 29d of the reduced diameter of the pressure maintaining valve 29 approaches the communication port 20g of the tensioner body 20. Consequently, since the communication port 20g is opened as shown in FIG. 18, the oil flows into the relief valve port 22e of the valve holder 22.

If, in such a state as just described, the tensioner slipper 15 is tilted rearwardly and the plunger 23 is pushed back strongly by variations of the rotating torque of the driving sprocket wheel 10 by an intermittent pressure rise of the pressure in a fuel chamber in the internal combustion engine 3 or the like, then the oil pressure in the high pressure oil chamber 31 rises, whereupon the valve body 26a of the relief valve 26 moves rearwardly. Consequently, the abutting face 26f (FIG. 15) of the tip portion 26c of the relief valve 26 is spaced away from the valve seat 25d (FIG. 15) of the check valve 25, whereupon the oil in a valve chamber 25e of the check valve 25 flows from between the valve seat 25d and the abutting face 26f of the tip portion 26c of the relief valve 26 back into the oil reserving chamber 28 through the relief valve port 22e of the valve holder 22 and the communication port 20g and the pressure maintaining valve accommodating hole 20f of the tensioner body 20. Consequently, an extraordinary increase in tension of the endless timing chain 13 is inhibited and flapping of the tensioner slipper 15 is suppressed.

Referring to FIG. 16, the plunger accommodating hole 20a of the tensioner body 20 is configured from a large diameter portion 41 at a rear portion and a small diameter portion 42 at a front portion, and a stepped portion 43 is formed on the boundary between them. Referring to FIG. 15, also the plunger 23 includes a large diameter portion 44 at a rear portion and a small diameter portion 45 at a front portion, and a stepped portion 46 is formed on the boundary between them. The plunger 23 is inserted into the tensioner body 20 from the rear. When the plunger is pushed by the pressure in the high pressure oil chamber 31 and projected forwardly until the stepped portion 46 of the plunger 23 is abutted with the stepped portion 43 of the plunger accommodating hole 20a, then the plunger 23 stops its forward movement. In other words, both stepped portions act as stoppers for preventing coming off of the plunger.

Figure 19:
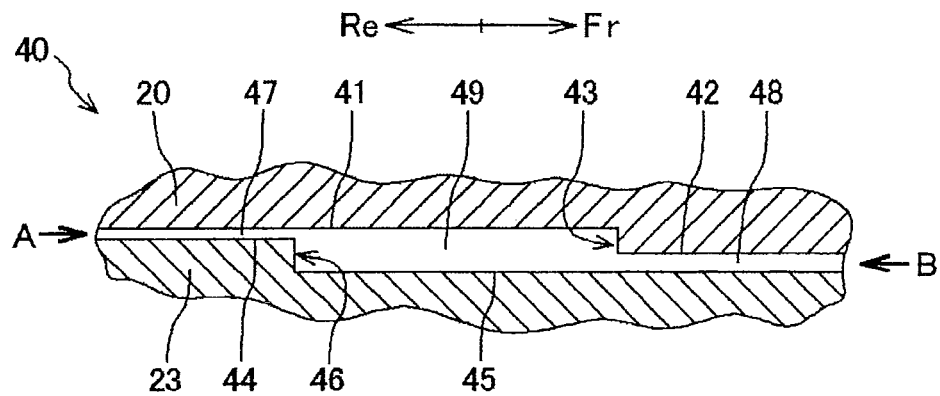
FIG. 19 is a partial enlarged view of a gap portion (between the plunger accommodating hole and the plunger) of FIG. 14.

First Leak Oil Emission Device:

FIG. 19 is a partial enlarged view of a gap portion 40 of FIG. 14. Although the gap between the tensioner body 20 and the plunger 23 is a gap in which the plunger 23 can slidably move, it is small to such a degree that no play occurs. In response to sliding movement of the plunger 23, oil in the high pressure oil chamber 31 enters the gap and enters a portion 49 of a large gap sandwiched between the stepped portions 43 and 46. When the plunger 23 moves forwardly, the oil in the portion 49 of the large gap is compressed. If the leak amount from a small diameter portion gap 48 at the front portion is small, then the forward movement of the plunger 23 is blocked. Accordingly, the area of the small diameter portion gap 48 on the downstream side is made greater than the area of a large diameter portion gap 47 so that flowing out of the oil is not blocked. In the present embodiment, with regard to both of the plunger accommodating hole 20a and the plunger 23, the upstream side is formed as a large diameter portion and the downstream side is formed as a small diameter portion in the flow of the flowing out oil.

Since the gap is very small, upon working of the inner diameter of the plunger accommodating hole 20a and the outer diameter of the plunger 23, a method for determination of the dimension of the small diameter portion gap 48 is described below assuming that reference dimensions (inner diameters and outer diameters) and working tolerances are set appropriately so that the large diameter portion gap 47 may have a required dimension. In particular, the inner diameters and the outer diameters (reference dimensions) and the working tolerances of the required portions are set such that the gap dimension B when the dimension of the small diameter portion gap 48 is formed smallest may be greater than the gap dimension A when the dimension of the large diameter portion gap 47 is formed greatest. In particular, where A="allowable maximum value of the inner diameter of the plunger accommodating hole large diameter portion 41"— "allowable minimum value of the outer diameter of the plunger accommodating hole large diameter portion 44" and B="allowable minimum value of the inner diameter of the plunger accommodating hole small diameter portion 42"— "allowable maximum value of the outer diameter of the plunger accommodating hole small diameter portion 45," the reference dimensions (inner diameters and outer diameters) and the working tolerances (allowable maximum values and allowable minimum values) with which the relationship of A<B may be satisfied are set.

While the leak oil emission device tries to manage the accuracy in area or dimension of the entire gap between the plunger accommodating hole 20a and the plunger 23, the following description is directed to leak oil emission device which forms an oil emitting groove 51 on a small diameter portion of the plunger accommodating hole 20a.

Figure 20:
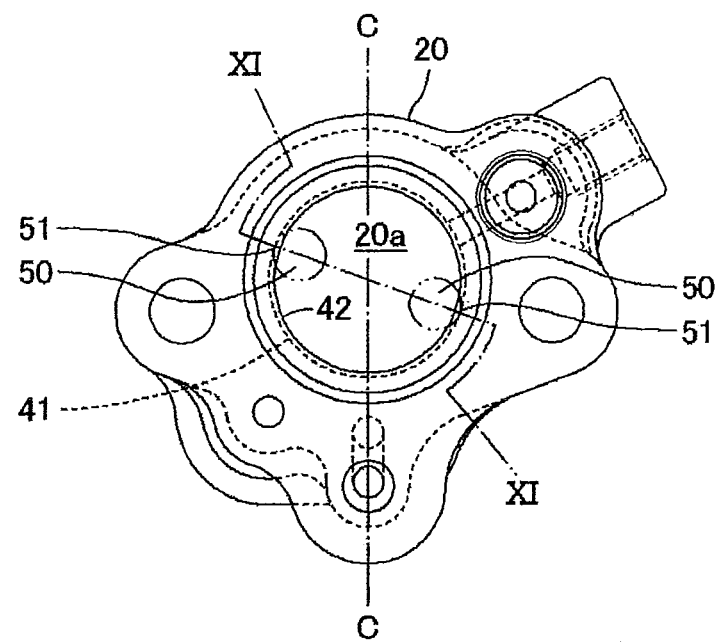
FIG. 20 is a front elevational view of the tensioner body 20.
Figure 21:
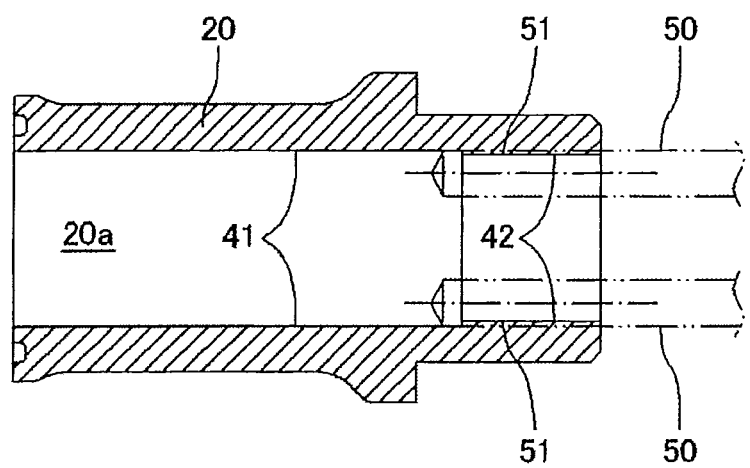
FIG. 21 is a sectional view taken along line XI-XI of FIG. 20.

Second Leak Oil Emission Device:

FIG. 20 is a front elevational view of the tensioner body 20. FIG. 21 is a sectional view taken along line XI-XI of FIG. 20. A working tool 50 is applied to the small diameter portion 42 of the plunger accommodating hole 20a from the front face of the tensioner body 20 to form the oil emitting groove 51, and the groove 51 is formed until the tip of the working tool 50 reaches the large diameter portion 41 of the plunger accommodating hole 20a. This can enhance the emitting performance of oil.

The leak oil emission device described in detail above has the following characteristics and effects.

1. Of the gaps between the plunger accommodating hole 20a and the plunger 23, the area of the small diameter portion gap 48 on the downstream side from which oils flows out is greater than the area of the large diameter portion gap 47 on the upstream side. By making the gap area on the upstream side set for oil pressure adjustment small and making the gap area on the downstream side greater than that on the downstream side, the oil emission performance on the downstream side which does not act for oil pressure adjustment is enhanced to reduce the sliding resistance of the plunger 23 by oil resistance. Consequently, the movement of the plunger 23 can be smoothened.

2. The reference dimensions and the working tolerances of the plunger accommodating hole 20a and the plunger 23 are set such that the gap dimension where the dimension of the small diameter portion gap 48 on the downstream side is formed smallest is greater than the gap dimension in the case where the dimension of the large diameter portion gap 47 on the upstream side is formed greatest to carry out working. Consequently, the dimension management of the gaps can be made sure and the oil emitting property of the downstream side can be enhanced.

3. The oil emitting groove 51 is formed on the sliding face of the plunger accommodating hole small diameter portion 42 of the tensioner body 20, and the upstream end thereof reaches the plunger accommodating hole large diameter portion 41. Consequently, the emitting performance of oil on the downstream side can be improved.

4. The plunger 23 has the stepped portion 46 formed from the plunger large diameter portion 44 on the upstream side and the plunger small diameter portion 45 on the downstream side, and the plunger accommodating hole 20a of the tensioner body 20 has the plunger accommodating hole stepped portion 43 formed from the plunger accommodating hole large diameter portion 41 corresponding to the plunger large diameter portion 44 on the upstream side of the plunger 23 and the plunger accommodating hole small diameter portion 42 corresponding to the plunger small diameter portion 45 on the downstream side of the plunger. This plunger stepped portion 46 is engaged with the plunger accommodating hole stepped portion 43 to form a coming off preventing structure for the plunger 23 (FIG. 19). The oil emitting groove 51 is formed on the plunger accommodating hole small diameter portion 42 such that the upstream end thereof extends to the plunger accommodating hole large diameter portion 41. Accordingly, the oil emission property when the plunger 23 moves forwardly can be improved.

5. The oil emitting groove 51 is formed by machining on the plunger accommodating hole small diameter portion 42 from the downstream end side and the working tool 50 is worked such that the tip thereof extends to the plunger accommodating hole large diameter portion 41 (FIG. 21). Accordingly, the oil emitting groove 51 can be formed readily.

6. The oil emitting groove 51 is disposed at a position clear of a plane (C-C plane of FIG. 20) including the direction of movement of the endless timing chain 13 and the axial line of the plunger 23. This is because, since the plunger 23 vibrates in the direction of movement of the endless timing chain 13, if the oil emitting groove 51 is provided in the plane including the direction of movement of the endless timing chain 13 and the plunger 23, then there is the possibility that an edge of the oil emitting groove 51 may damage the plunger 23, it is intended to avoid this.

7. In a state in which the hydraulic tensioner 0 is attached to the vehicle, the hydraulic tensioner 0 is attached such that the oil emitting direction of the oil emitting groove 51 is directed downwardly from the horizontal direction (FIG. 11). Consequently, since also emission by the self weight of oil becomes possible, the oil can be emitted well.

8. The oil emitting groove 51 is provided in a pair at opposing positions with respect to the center line of the plunger accommodating hole 20a of the tensioner body 20 (FIG. 20). By disposing such oil emission grooves not at neighboring positions but in a spaced relationship in opposing disposition, oil can be emitted well while suppressing a drop in strength of the tensioner body 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic tensioner, comprising:
a plunger, said plunger being acted upon by reactive force from an endless power transmitting chain;
a plunger body cooperating with said plunger to form a high pressure oil chamber for storing pressure oil therein;
a biasing device accommodated in said plunger, said biasing device being configured to push out said plunger toward said endless power transmitting chain;
an oil supply path configured to supply oil into said high pressure oil chamber;
a check valve configured to permit supply of the oil from said oil supply path into said high pressure oil chamber;
a relief valve configured to communicate a relief path with an oil pressure higher than a predetermined oil pressure in said high pressure oil chamber; and
a pressure maintaining valve interposed in said relief path for being opened and closed by the oil pressure of said oil supply path,
wherein said oil supply path includes a first branching path for operating said pressure maintaining valve and a second branching path for directly supplying the oil to said check valve without operating the pressure maintaining valve, the first and second branching paths are configured in such a manner that supplying the oil to said check valve via the second branching path is independent of operating said pressure maintaining valve via the first branching path.

2. The hydraulic tensioner according to claim 1, wherein said relief path and said oil supply path are in communication with each other by an oil supply pressure to said pressure maintaining valve.

3. The hydraulic tensioner according to claim 2, wherein said pressure maintaining valve is provided in a returning path in communication with said relief path and said oil supply path, and in said returning path, a cylindrical valve body of the pressure maintaining valve is formed in a cylindrical shape and a top portion side circumferential face of said cylindrical valve body is formed with a reduced diameter.

4. The hydraulic tensioner according to claim 2, wherein an oil emitting groove is formed on a downstream side sliding face of said plunger body such that an upstream end thereof extends to said upstream side gap.

5. The a hydraulic tensioner according to claim 4, wherein: said plunger has a plunger stepped portion formed from a plunger large diameter portion on the upstream side and a plunger small diameter portion on the downstream side; said plunger body has a plunger accommodating hole stepped portion formed from a plunger accommodating hole large diameter portion corresponding to said plunger large diameter portion on the upstream side of said plunger and a plunger accommodating hole small diameter portion corresponding to said plunger small diameter portion of said plunger; said plunger stepped portion of said plunger engages with said plunger accommodating hole stepped portion of said plunger body to form a coming off preventing structure for said plunger; and said oil emitting groove is formed on said plunger accommodating hole small diameter portion such that an upstream end thereof extends to said plunger accommodating hole large diameter portion.

6. The a hydraulic tensioner according to claim 5, wherein said oil emitting groove is formed by machining said plunger accommodating hole small diameter portion from the downstream end side, and the tip of the working tool reaches said plunger accommodating hole large diameter portion.

7. The hydraulic tensioner according to claim 4, wherein said oil emitting groove is disposed at a position clear of the direction of movement of an endless timing chain.

8. The hydraulic tensioner according to claim 4, wherein, in a state in which said hydraulic tensioner is attached to a vehicle, said hydraulic tensioner is disposed such that an oil emission direction of said oil emitting groove is directed downwardly with respect to a horizontal direction.

9. The hydraulic tensioner according to claim 4, wherein there is a pair of said oil emitting groove at opposing positions with respect to the center line of a plunger accommodating hole of said plunger body.

10. The hydraulic tensioner according to claim 1, wherein a drain oil path in communication with the outside is provided in said plunger body, and said relief path and said drain oil path are in communication with each other by an oil supply pressure to said pressure maintaining valve.

11. The hydraulic tensioner according to claim 10, wherein said pressure maintaining valve is formed in a cylindrical shape, and a cylindrical portion top face upon which operating oil acts and an emission hole for emitting the operating oil to said drain oil path side are provided on a cylindrical portion side face such that the operating oil is emitted through an inside of said pressure maintaining valve.

12. The hydraulic tensioner according to claim 1, wherein said oil supply path is configured through the inside of a valve body that configures said relief valve, and oil is supplied from an end portion of said relief valve.

13. The hydraulic tensioner according to claim 1, wherein a holding plate configured to hold an end portion of a coil spring that biases said relief valve is disposed at a location of said oil supply path to which the oil is supplied from an end portion of said relief valve, and an oil introduction hole is provided in said holding plate.

14. The hydraulic tensioner according to claim 1, wherein said pressure maintaining valve is provided in a converging relief path to which a plurality of said relief paths converge after being formed radially from a hydraulic cylinder.

15. The hydraulic tensioner according to claim 1, further comprising a gap portion, through which oil in said high pressure oil chamber can flow out to the outside, is provided between an inner circumferential face of said plunger body and an outer circumferential face of said plunger, wherein a downstream side gap of said gap portion through which the oil flows out has an area greater than that of an upstream side gap of said gap portion.

16. The hydraulic tensioner according to claim 15, wherein inner and outer diameters and working tolerances are set such that a gap dimension where the dimension of said downstream side gap is formed smallest is greater than a gap dimension where the dimension of said upstream side gap is formed greatest.

17. The hydraulic tensioner according to claim 1, further comprising an oil reserving chamber located upstream of the check valve and the pressure maintaining value, the first and second branching paths being originated from the oil reserving chamber, wherein the oil reserving chamber is positioned at one end of the hydraulic tensioner, opposite to the high pressure oil chamber.

* * * * *